United States Patent [19]
Takasugi

[11] Patent Number: 6,057,986
[45] Date of Patent: May 2, 2000

[54] SUPPORT MECHANISM FOR MAGNETIC HEAD SLIDERS AND METHOD FOR PRODUCING THE SAME

[75] Inventor: Satoru Takasugi, Kyoto, Japan

[73] Assignee: Suncall Corporation, Kyoto-fu, Japan

[21] Appl. No.: 09/072,873

[22] Filed: May 5, 1998

[30] Foreign Application Priority Data

Jul. 23, 1997 [JP] Japan .................................. 9-197437

[51] Int. Cl.⁷ ...................................................... G11B 5/48
[52] U.S. Cl. .......................................................... 360/104
[58] Field of Search ............................................ 360/104

[56] References Cited

U.S. PATENT DOCUMENTS

| | | | |
|---|---|---|---|
| 5,491,597 | 2/1996 | Bennin | 360/104 |
| 5,680,274 | 10/1997 | Palmer | 360/104 |
| 5,796,554 | 8/1998 | Berding | 360/104 |
| 5,812,344 | 9/1998 | Balakrishnan | 360/104 |
| 5,867,347 | 2/1999 | Knight | 360/104 |
| 5,901,016 | 5/1999 | Iwamoto | 360/104 |

FOREIGN PATENT DOCUMENTS

| | | |
|---|---|---|
| 53-30310 | 3/1978 | Japan . |
| 60-246015 | 12/1985 | Japan . |
| 6-215513 | 8/1994 | Japan . |
| 6-243449 | 9/1994 | Japan . |

Primary Examiner—A. J. Heinz
Attorney, Agent, or Firm—Knobbe, Martens, Olson & Bear, LLP

[57] ABSTRACT

A support structure for a magnetic head slider for reading/writing includes: (a) a wiring flexure including: (i) a plate substrate having a distal end and a proximal end and having an opening at the proximal end; (ii) an insulating layer formed on the plate substrate and having at least one through-hole at its proximal end; (iii) a conductor layer formed on the insulating layer; and (iv) a protection layer formed on the conductor layer and having at least one through-hole at its distal end; (b) a load beam having two sides through which an aperture is formed; and (c) an arm having a distal end where the load beam is supported. The wiring flexure passes through the aperture of the load beam and is fixed at a position between its distal end and its proximal end.

21 Claims, 42 Drawing Sheets

FIG. 6
(a)
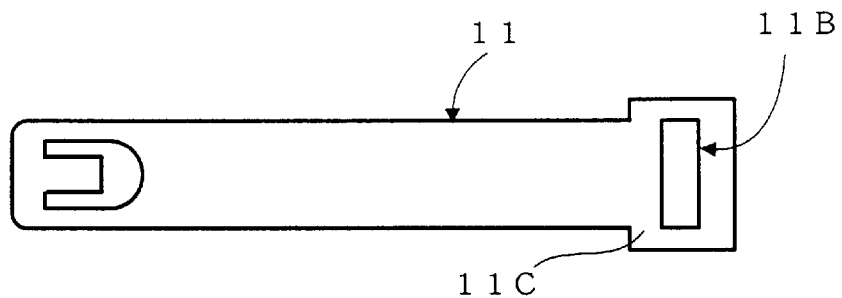
(b)
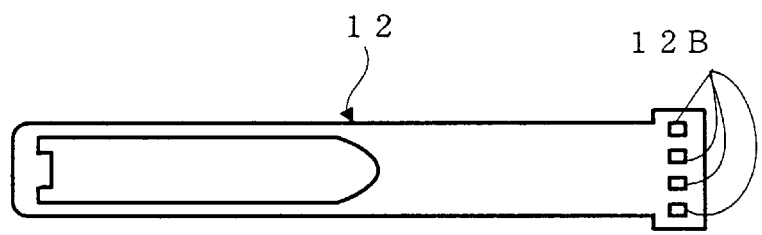
(c)
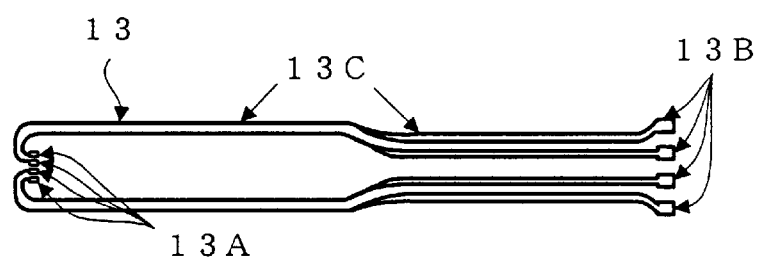
(d)
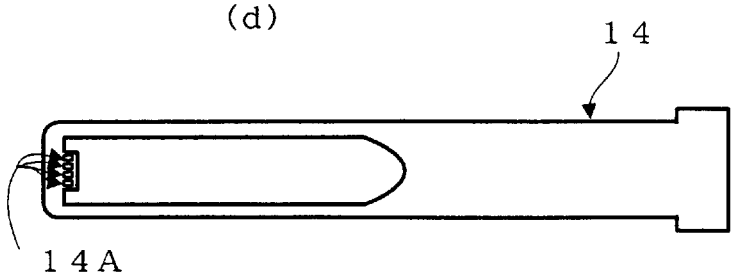

FIG. 7
(a)
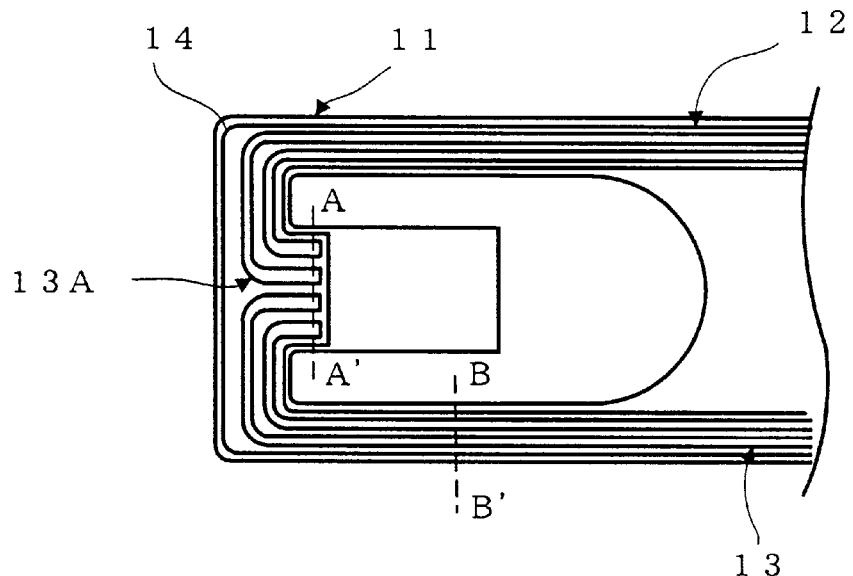
(b)
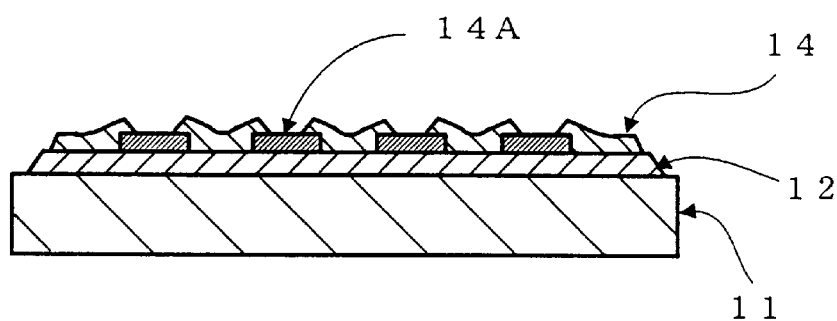
(c)
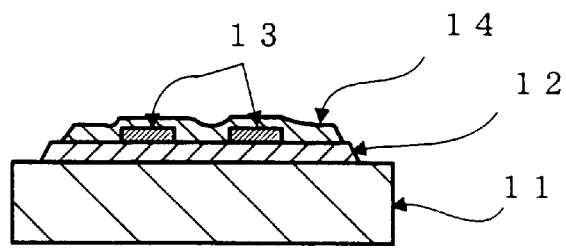

FIG. 8
(a)
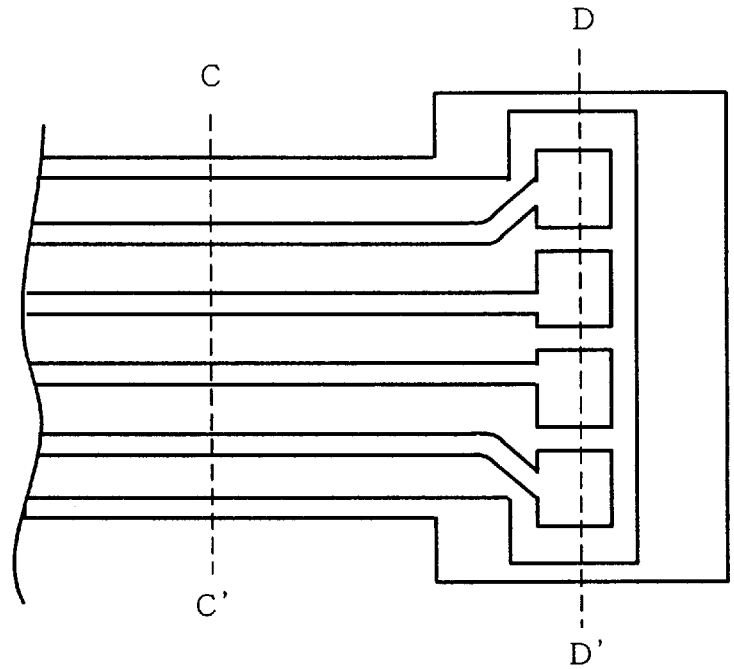
(b)
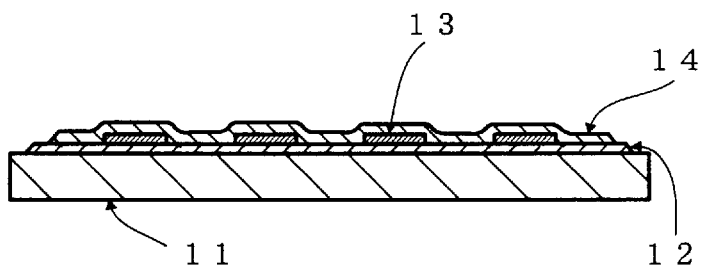
(c)
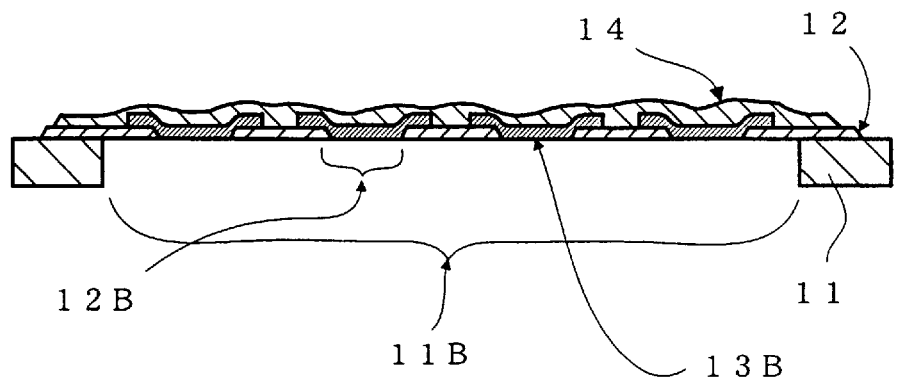

FIG. 41
(f)
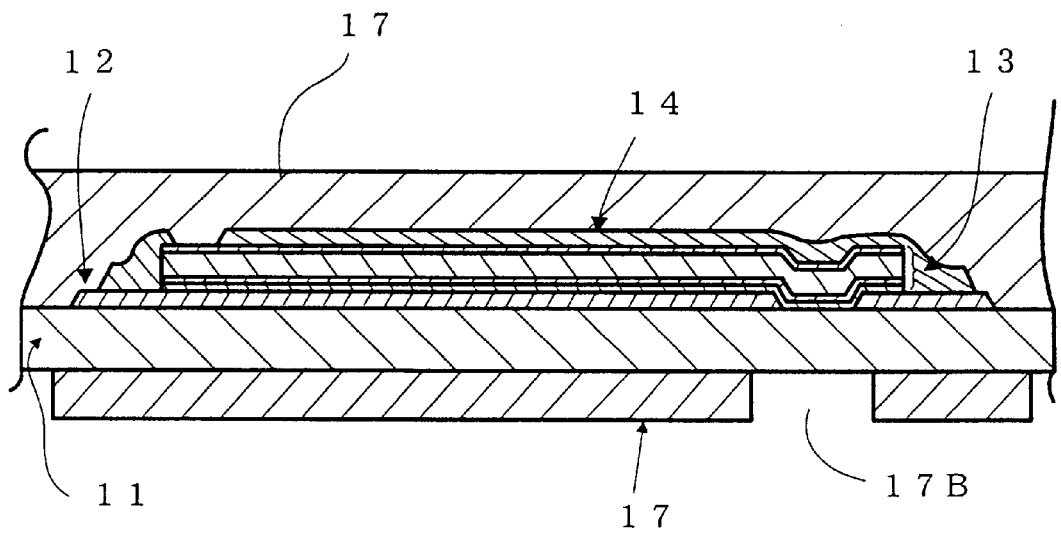
(g)
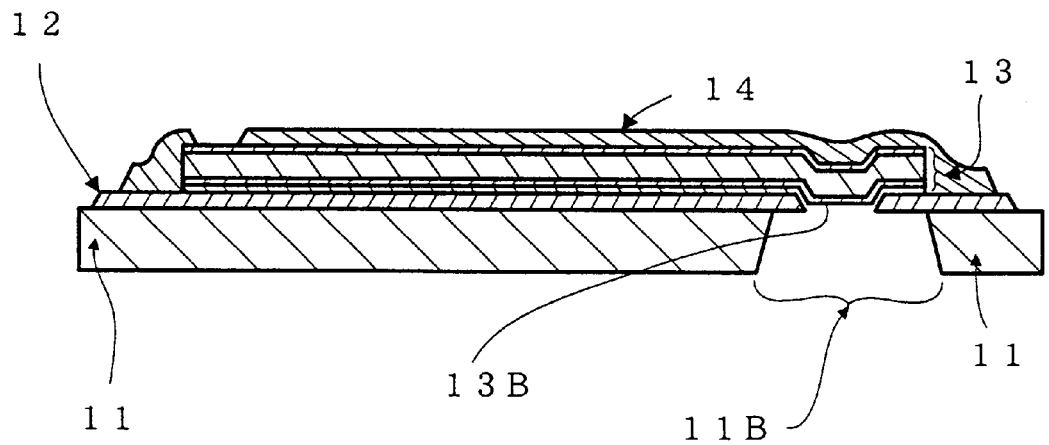

FIG. 42
(a)
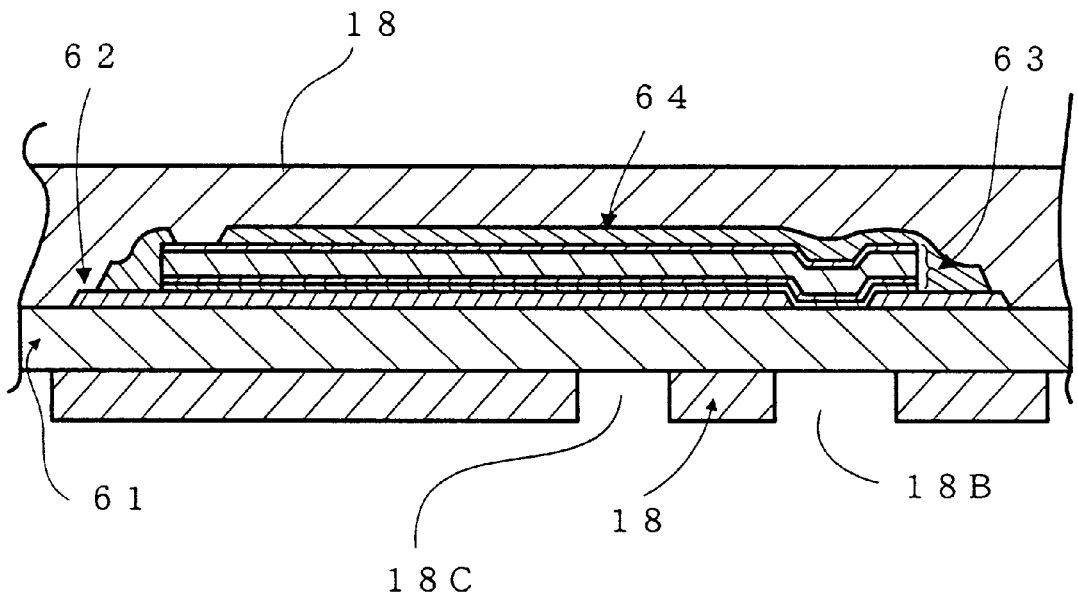
(b)
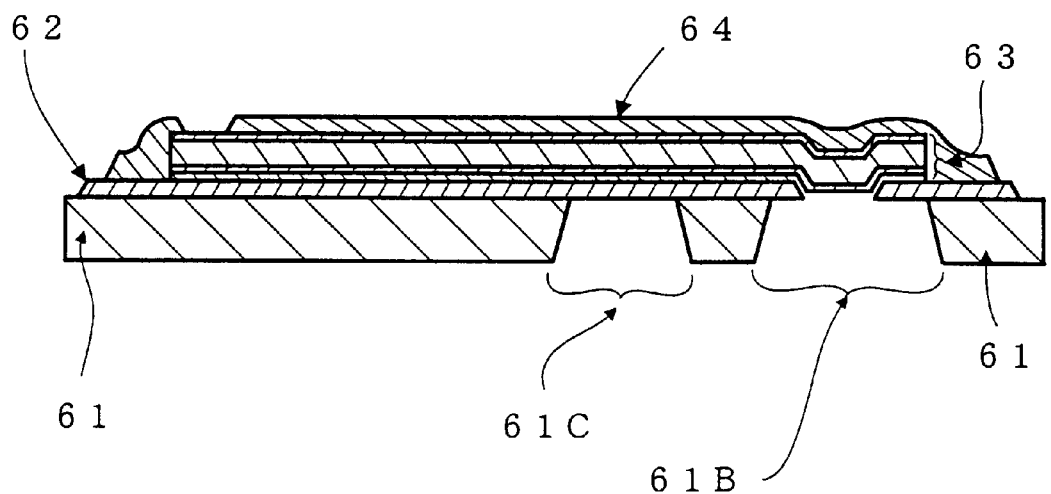

SUPPORT MECHANISM FOR MAGNETIC HEAD SLIDERS AND METHOD FOR PRODUCING THE SAME

TECHNICAL FIELD

The present invention relates to a support mechanism for magnetic sliders, and more particularly to a wiring-integrated support mechanism for magnetic head sliders and a method of producing the same.

BACKGROUND OF THE INVENTION

Recently, it has been reported that rigid disk drives have the following disadvantages that: i) the stiffness of leads, i.e., electrical wires such as Au wires connected to a magnetic head, adversely affects the flying characteristics of a slider as magnetic head sliders are downsized; and that ii) since connecting the leads to the magnetic head or attaching the magnetic head slider to a suspension supporting it is done by hand, the improvement of productivity has been obstructed. To eliminate these disadvantages, Japanese Unexamined Patent Publications Nos. 30310/1978, 246015/1985 and 215513/1994 disclose wiring-integrated suspensions in which a wiring structure is formed integrally with a suspension (i.e., a support member for supporting a magnetic head slider at its distal end).

According to such a support mechanism in which a wiring-integrated suspension is attached directly on an arm by welding or the like, it is necessary to connect the wiring structure on the suspension surface (i.e., the magnetic disk side surface having a slider attached thereon) to a flexible print circuit (hereinafter referred to as "FPC") attached on the opposite side surface of the arm relative to the magnetic disk.

To fulfill this, Japanese Unexamined Patent Publication No. 243449/1994 discloses a slider support mechanism in which a flexure acting as a suspension is attached on the disk side surface of the arm, wherein the wiring structure is folded upward at side edge of the flexure, a connection land is formed on the folded portion of the wiring structure to thereby connect the wiring structure on the disk side surface of the flexure to the FPC on the rear side surface of the arm. With this construction, the disclosed mechanism is to solve the following problem. That is, the FPC on the rear side surface of the arm is folded toward the disk side surface in the connecting portion between the arm and the flexure, and then the FPC is connected to the wiring structure on the disk side surface of the flexure of the suspension via the connection land. Since the connection land is a bulky solder projection, the distances cannot be reduced between the flexure, the arm and the magnetic disk.

However, as disclosed in the Publication, when the wiring structure on the disk side surface of the suspension is folded toward the rear side, it is often damaged because of the tension generated thereon. Further, even if the wiring structure is not damaged, the reliability of the wiring structure decreases with time.

According to the assembly process of such a slider support mechanism, it is necessary to fold up the wiring structure of the disk side surface of the suspension onto the opposite side surface and secure it there, whereby the process is complicated and costly. Further, because of being folded, the wiring structure is often likely to be damaged, for example, by a mold or the like used for pressing.

The wiring-integrated flexure is manufactured by laminating a polyimide insulating layer, a Cu wiring layer and a polyimide protection layer on a sheet constituting a flexure substrate and made of stainless steel (Matsumoto et al., "Development of a gimbal integrated suspension substrate for magnetic heads", 15A-13 of Proceedings of the 9th JIPC Annual Meeting). In this process, more flexure patterns are arranged in a sheet of certain area to reduce production cost most effectively.

However, according to the flexure requiring the wiring structure to be folded as described, since the folded portion projects orthogonal to a longitudinal direction of the flexure pattern, the flexure patterns cannot be formed densely in the sheet. Accordingly, the above flexure produces unwanted areas in the sheet, resulting in an increased production cost.

The object of the present invention is to solve the above problems and to enable it to easily connect the wiring structure on the disk side surface of a suspension to the FPC and the like attached on the rear side surface of the arm, thereby producing a support mechanism for magnetic head sliders at low cost.

Another object of the present invention is to provide a simple method of producing the support mechanism for magnetic head sliders.

SUMMARY OF THE INVENTION

To fulfill the above objects, the present invention provides a support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk and the mechanism comprising:

a flexure comprising: i) a substrate of plate shape wherein the magnetic head slider is mounted on the disk side surface of a distal end portion of the substrate; and ii) a wiring structure including an insulating layer on the disk side surface, a conductor layer extending longitudinally of the substrate on the insulating layer; and a protection layer covering the conductor layer;

a load beam longitudinally joined to the flexure substrate and constituting a suspension together with the flexure; and an arm mounted on the rotational shaft at its proximal end portion and joined to the joining region of the load beam at its distal end portion to support the load beam, wherein the conductor layer includes i) slider pads provided on the distal end portion of the substrate and connected to the magnetic head of the magnetic head slider and ii) terminal pads provided on the proximal end portion of the substrate and connected to external wiring, wherein the load beam has an aperture extending from the disk side surface of the load beam to the opposite rear side surface of the load beam, wherein the flexure has its distal end portion extending along the disk side surface of the load beam and has the proximal end portion passing through the aperture of the load beam to reach the rear side surface of the load beam, the insulating layer having at least one opening and the flexure substrate having at least one opening, wherein the terminal pads are located at the positions corresponding to said at least one opening in the flexure substrate and to said at least one opening in the insulating layer.

Preferably, the load beam has the disk side surface of the joining region jointed to the rear side surface of the distal end portion of the arm, and wherein the terminal pads of the flexure is arranged on the rear side surface of the load beam joining region.

Preferably, the load beam has the disk side surface of the joining region jointed to the rear side surface of the distal end portion of the arm, and wherein the flexure has the proximal end portion of the substrate extending beyond the load beam joining region to reach the arm and jointed to the rear side surface of the arm, and wherein the terminal pads are arranged to extend beyond the load beam joining region to reach the rear side surface of the arm.

Preferably, the load beam has the rear side surface of the joining region jointed to the disk side surface of the distal end portion of the arm, and wherein the flexure has the proximal end portion of the substrate extending to reach the rear side surface of the arm and jointed thereto, and wherein the terminal pads are arranged on the rear side surface of the arm.

Preferably, the arm has a cutout formed in the distal end portion, which cutout is opened toward the distal edge of the arm, and wherein the terminal pads of the flexure are located within the cutout of the arm.

The present invention also provides a support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk and comprising:

a flexure comprising: i) a substrate of plate shape wherein the magnetic head slider is mounted on the disk side surface of a distal end portion of the substrate; and ii) a wiring structure including an insulating layer on the disk side surface, a conductor layer extending longitudinally of the substrate on the insulating layer; and a protection layer covering the conductor layer;

a load beam longitudinally joined to the flexure substrate and constituting a suspension together with the flexure; and an arm mounted on the rotational shaft at its proximal end portion and joined to the joining region of the load beam at its distal end portion to support the load beam, wherein the conductor layer includes i) slider pads provided on the distal end portion of the substrate and connected to the magnetic head of the magnetic head slider and ii) terminal pads provided on the proximal end portion of the substrate and connected to external wiring, wherein the load beam has an aperture extending from the disk side surface of the load beam to the opposite rear side surface of the load beam and has the disk side surface of the joining region joined to the rear side surface of the arm, the proximal end of the aperture extending beyond the distal end of the arm, wherein the flexure has the distal end portion extending along the disk side surface of the load beam and has the disk side surface of the proximal end portion of the substrate joined to the rear side surface of the arm within the aperture of the load beam, and wherein the terminal pads are located within the aperture of the load beam and at the positions corresponding to said at least one opening in the flexure substrate and to said at least one opening in the insulating layer.

Preferably, the arm has a cutout formed in the distal end, which cutout is opened toward the distal edge of the arm, and wherein the terminal pads of the flexure are located within the cutout of the arm.

Preferably, the load beam is bent with load so that the magnetic head slider to be mounted on the flexure may come near the magnetic disk.

Preferably, the aperture of the load beam is formed in the load-bent region, and wherein the flexure is formed of only wiring at least at the position corresponding to the load-bet region of the load beam.

The present invention also provides a support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk and comprising:

a flexure constituting a suspension and comprising: i) a substrate of plate shape wherein the magnetic head slider is mounted on the disk side surface of a distal end portion of the substrate; and ii) a wiring structure including an insulating layer on the disk side surface, a conductor layer extending longitudinally of the substrate on the insulating layer; and a protection layer covering the conductor layer; and an arm mounted on the rotational shaft at its proximal end portion and joined to the joining region of the load beam at its distal end portion to support the load beam, wherein the conductor layer includes i) slider pads provided on the distal end portion of the substrate and connected to the magnetic head of the magnetic head slider and ii) terminal pads provided on the proximal end portion of the substrate and connected to external wiring, and wherein the terminal pads of the flexure are located at the positions corresponding to said at least one opening in the flexure substrate and to said at least one opening in the insulating layer.

Preferably, the flexure substrate has the disk side surface of the joining region joined to the rear side surface of the distal end portion of the arm, and wherein the terminal pads of the flexure are arranged on the rear side surface of the arm.

Preferably, the flexure substrate has the rear side surface of the joining region joined to the disk side surface of the distal end portion of the arm, and wherein the terminal pads of the flexure are arranged on the rear side surface of the arm.

Preferably, the arm has a cutout formed in the distal edge portion of the arm, which cutout is opened toward the distal end of the arm, and wherein the terminal pads of the flexure are located within the cutout of the arm.

Preferably, the flexure substrate is bent with load so that the magnetic head slider to be mounted on the flexure may come near the magnetic disk, and wherein the flexure has no substrate under the wiring structure in the load-bent region.

Preferably, a flexible print-circuit substrate is joined to the rear side surface of the arm, which flexible print-circuit substrate is connected at its one end to the terminal pads of the flexure.

The present invention also provides a method of producing a support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk and comprising: i) a flexure having a substrate and including a conductor layer formed on the disk side surface of the substrate, which conductor layer having slider pads and terminal pads, the slider pads being connected to a magnetic head of the magnetic head slider and terminal pads being connected to external wiring and exposed on the rear side surface of the substrate; ii) a load beam jointed longitudinally to the flexure substrate; and iii) an arm having its proximal end attached to a rotational shaft and having its distal end portion joined to the joining region of the proximal end portion of the load beam, the method comprising:

a first step of forming an insulating pattern having at least one opening in the disk side surface of the flexure substrate, said at least one opening being located to correspond to the terminal pads;

a second step of forming a plating feed layer on the insulating layer and the exposed disk side surface of the flexure substrate;

a third step of i) forming a first resist layer on the plating feed layer except the region on which the conductor layer is formed and also forming the first resist layer on the rear side surface of the flexure substrate and ii) sequentially laminating an etching stopper layer, an intermediate layer and a surface layer except the region on which the first resist is formed, by electric plating using the plating feed layer as an electrode, the three layers constituting the conductor layer;

a forth step of removing the first resist layer and etching the feed layer using the conductor layer as a mask except the region on which the conductor is formed;

a fifth step of forming a protection layer covering the conductor layer except the region where the slider pads are formed, a sixth step of i) forming a second resist on the rear side surface of the flexure substrate, the second resist having at least one opening at the positions corresponding to the terminal pads, and also forming the second resist on the entire disk side surface of the flexure substrate and ii) etching the flexure substrate and the feed layer on the flexure substrate using the second resist as a mask so as to form a substrate having at least one opening at the position corresponding to the terminal pads;

a seventh step of i) joining the rear side surface of the distal end portion of the flexure substrate to the disk side surface of the load beam after passing the flexure through the aperture formed in the load beam and ii) joining the disk side surface of the proximal end portion of the flexure substrate to the rear side surface of the load beam;

a eighth step of joining the disk side surface of the joining region of the load beam to the rear side surface of the arm; and a ninth step of subjecting the load beam to a bending process with load.

Preferably, the method comprises, instead of the above seventh and eighth steps, the steps of:

i) joining the rear side surface of the distal end portion of the flexure to the disk side surface of the load beam after passing the flexure through the aperture formed in the load beam and ii) joining the disk side surface of the joining region of the load beam to the rear side surface of the arm, wherein the flexure substrate has a region corresponding to the terminal pads, which region is jointed to the rear side surface of the arm beyond the jointing area of the load beam.

Preferably, the method comprises, instead of the above seventh and eighth steps, the steps of:

i) joining the rear side surface of the distal end portion of the flexure to the disk side surface of the load beam; and ii) joining the disk side surface of the joining region of the load beam to the rear side surface of the arm and joining the disk side surface of the flexure substrate, at the positions corresponding to the terminal pads, to the rear side surface of the arm within the aperture of the load beam.

Preferably, the method comprises, instead of the above seventh and eighth steps, the steps of:

i) joining the rear side surface of the distal end portion of the flexure to the disk side surface of the load beam after passing the flexure through the aperture formed in the load beam; and ii) joining the rear side surface of the joining region of the load beam to the disk side surface of the arm and joining the disk side surface of the flexure substrate, at the positions corresponding to the terminal pads, to the rear side surface of the arm.

The present invention also provides a method of producing a support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk and comprising: i) a flexure having a substrate and including a conductor layer formed on the disk side surface of the substrate, which conductor layer having slider pads and terminal pads, the slider pads being connected to a magnetic head of the magnetic head slider and terminal pads being connected to external wiring and exposed on the rear side surface of the substrate; and ii) an arm having its proximal end attached to a rotational shaft and having its distal end portion joined to the joining region of the proximal end portion of the flexure, the method comprising:

a first step of forming an insulating pattern having at least one opening on the disk side surface of the flexure substrate, said at least one opening being located to correspond to the terminal pads;

a second of forming a plating feed layer on the insulating layer and the exposed disk side surface of the flexure substrate;

a third step of i) forming a first resist layer on the plating feed layer except the region on which the conductor layer is formed and also forming the first resist layer on the rear side surface of the flexure substrate and ii) sequentially laminating an etching stopper layer, an intermediate layer and a surface layer except the region on which the first resist is formed, by electric plating using the plating feed layer as an electrode;

a forth step of removing the first resist layer and etching the feed layer using the conductor layer as a mask except the region on which the conductor is formed;

a fifth step of forming a protection layer covering the conductor layer except the region where the slider pads are formed, a sixth step of i) forming a second resist on the rear side surface of the flexure substrate, the second resist having at least one opening at the positions corresponding to the terminal pads, and also forming the second resist on the entire disk side surface of the flexure substrate and ii) etching the flexure substrate and the feed layer on the flexure substrate using the second resist as a mask so as to form a substrate having at least one opening at the position corresponding to the terminal pads;

a seventh step of Joining the disk side surface of the joining region of the flexure to the rear side surface of the arm; and an eighth step of subjecting the flexure to a bending operation with load so that the magnetic head to be mounted on its distal end portion may come near the magnetic disk.

Preferably, the method comprises, instead of the above seventh step, the steps of:

i) joining the disk side surface of the flexure substrate, at the positions corresponding to the terminal pads, to the rear side surface of the distal end portion of the arm; and ii) Joining the rear side surface of the joining region of the flexure substrate to the disk side surface of the arm.

Preferably, the method comprises, instead of the above sixth step, the steps of:

i) forming a second resist on the rear side surface of the flexure substrate such that the second resist may have openings at the positions corresponding to the terminal pads and to the load-bent region, and ii) etching the flexure substrate and the feed layer using the second resist as a mask so as to form a substrate pattern having at least one opening corresponding to the terminal pads and to the load-bent region.

BRIEF DESCRIPTION OF THE DRAWING

FIG. 6 illustrates a flexure of the magnetic head slider mechanism shown in FIG. 1;

FIG. 7 illustrates a gimbal portion of the flexure shown in FIG. 6;

FIG. 8 illustrates the terminal pads shown in FIG. 6;

FIG. 41 illustrates part of the assembly process of the support mechanism for magnetic head sliders of FIG. 1; and FIG. 42 illustrates part of the assembly process of the support mechanism for magnetic head sliders of FIG. 15.

DETAILED DESCRIPTION

Embodiment 1

Figure 1:
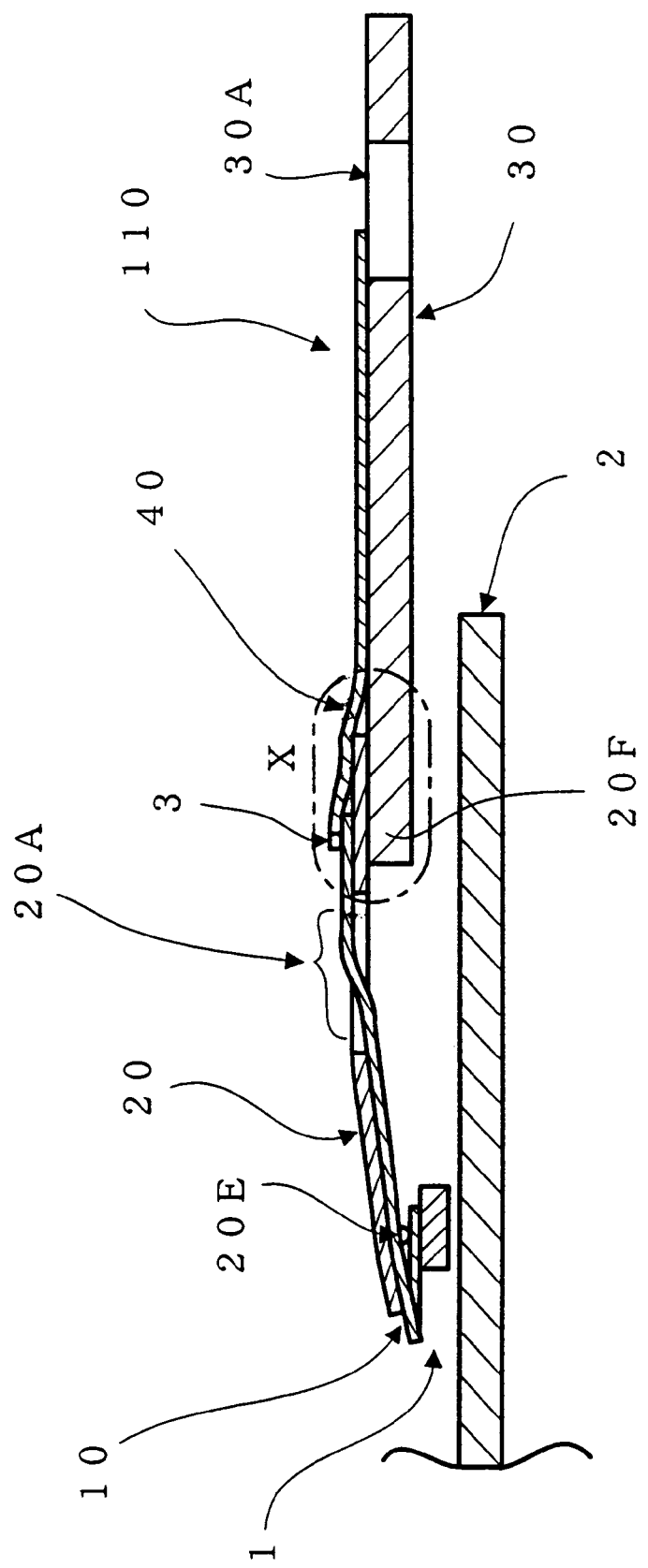
FIG. 1 is a vertical cross section of a support mechanism for magnetic head sliders according of the first embodiment.
Figure 2:
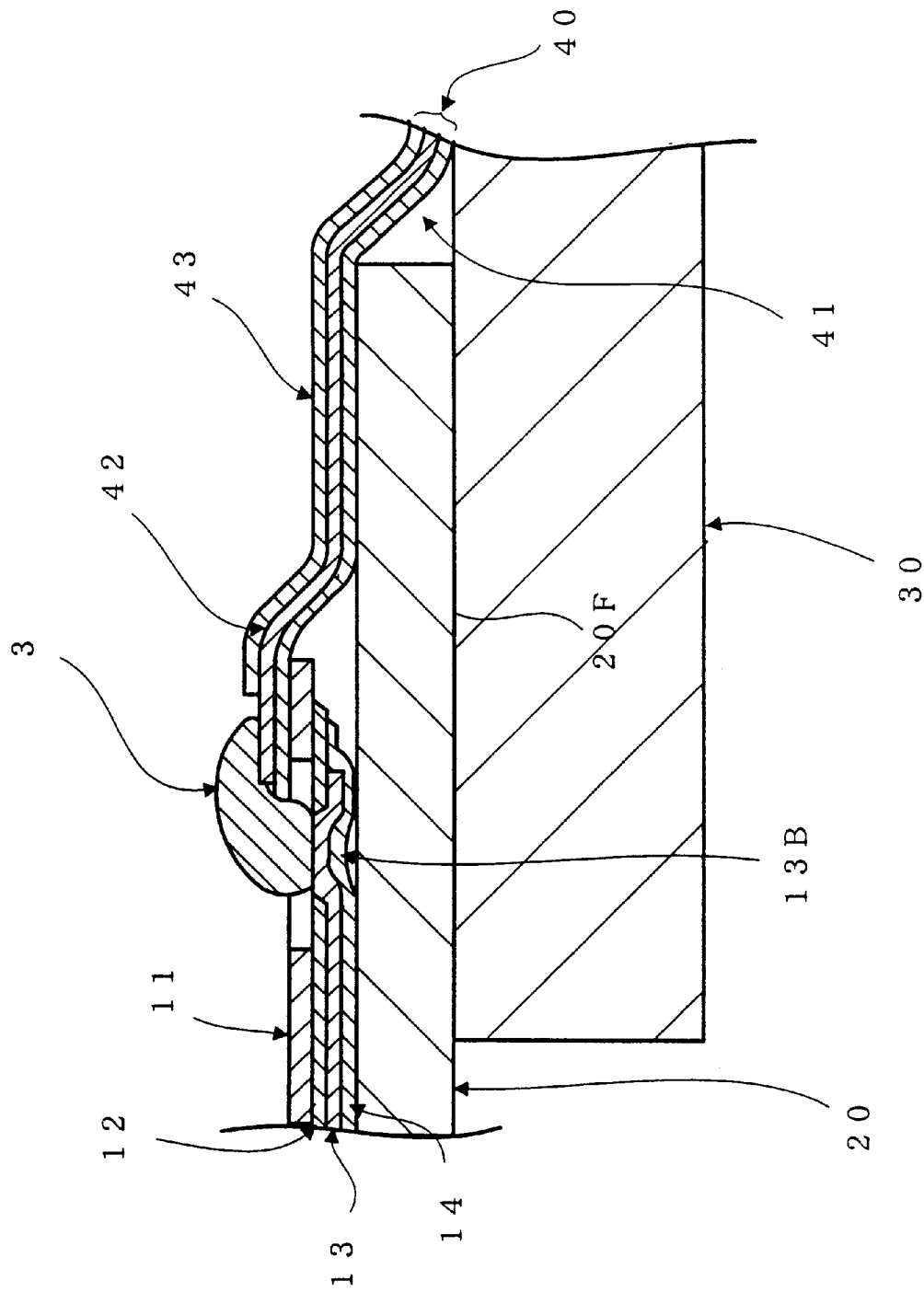
FIG. 2 is an enlarged view of the portion denoted at X in FIG. 1.
Figure 3:
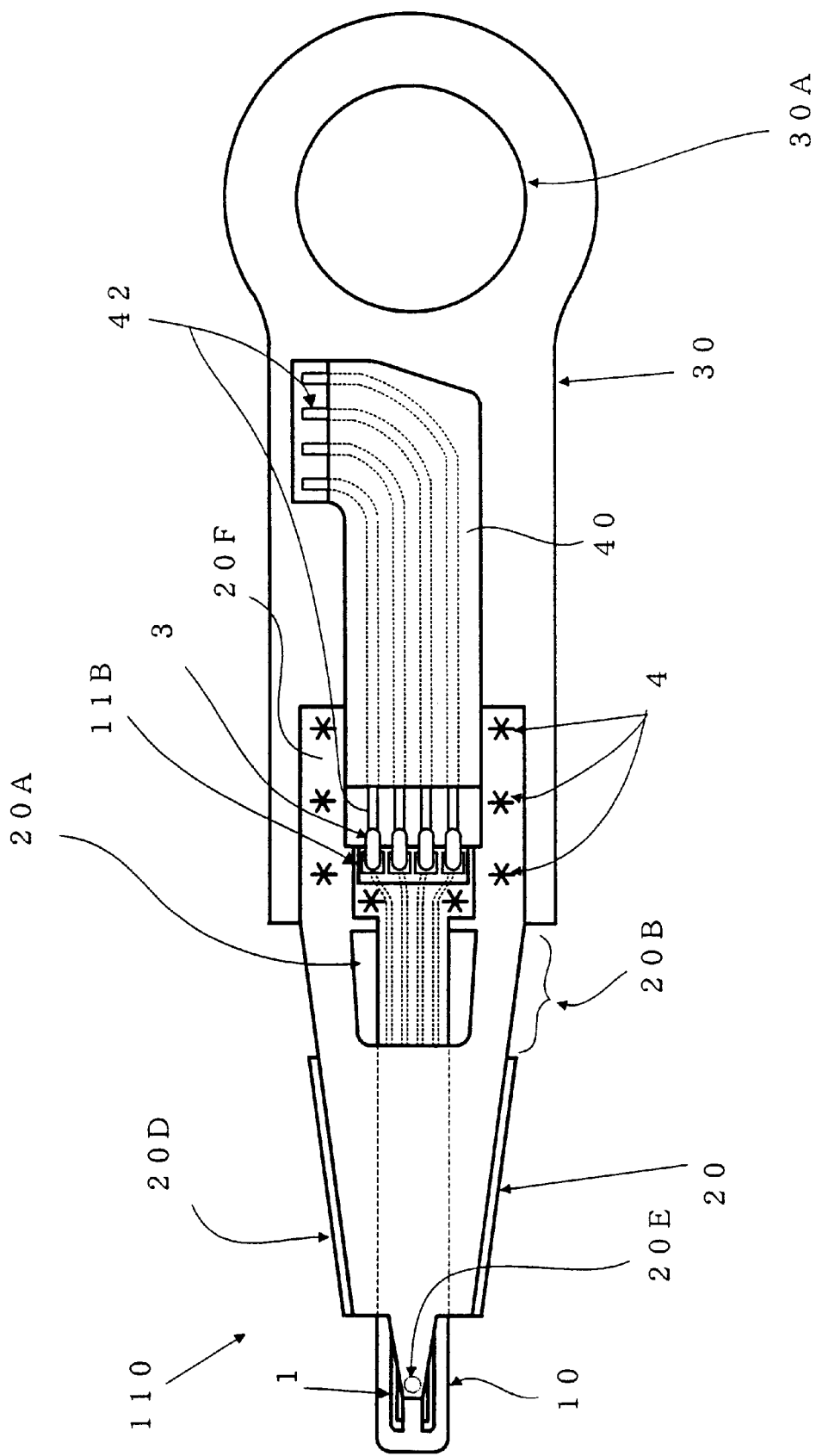
FIG. 3 illustrates the support mechanism for magnetic head sliders 110 of FIG. 1, as viewed from its rear side.
Figure 4:
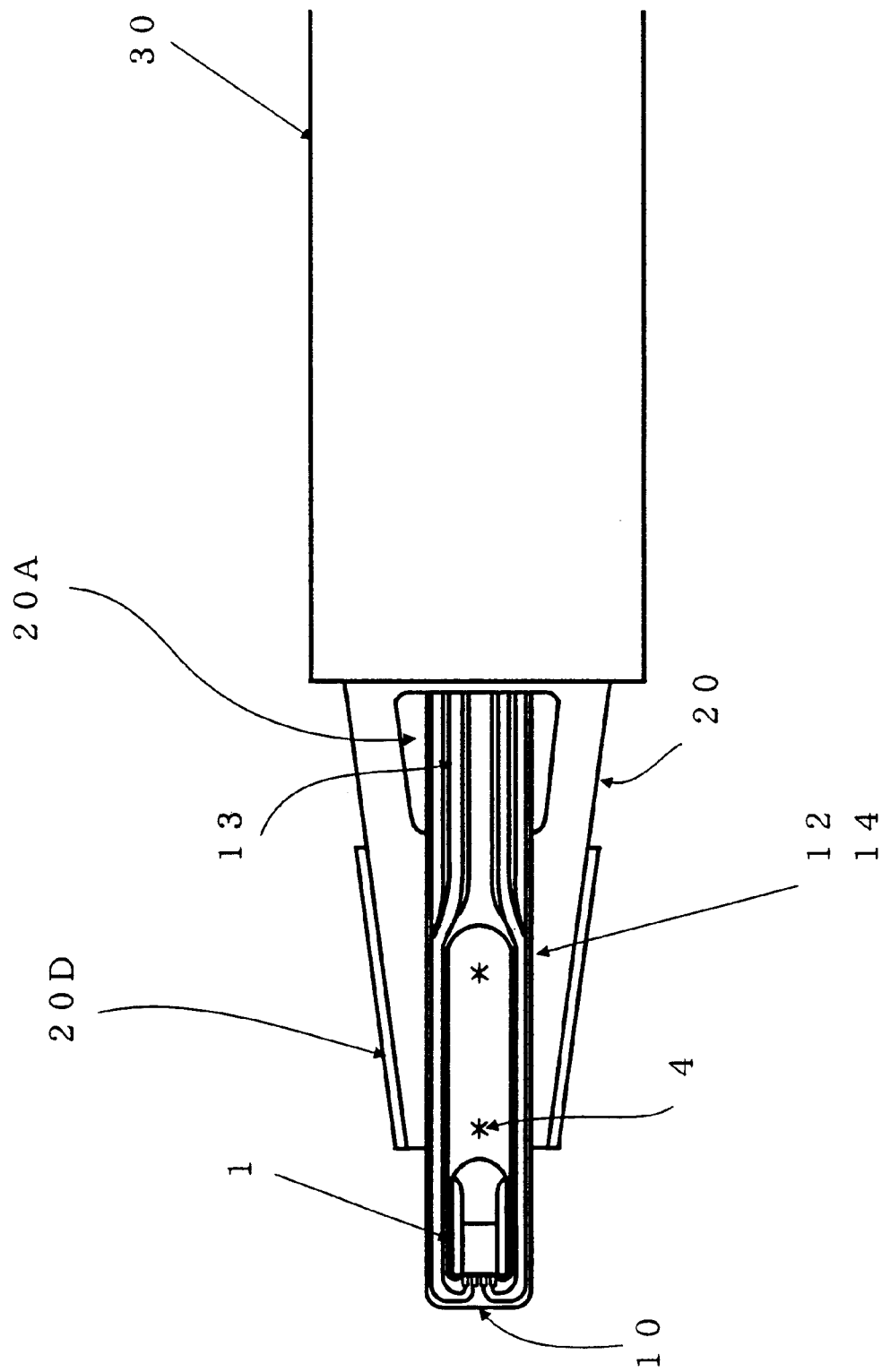
FIG. 4 illustrates the mechanism of FIG. 1, as viewed from its disk side.
Figure 5:
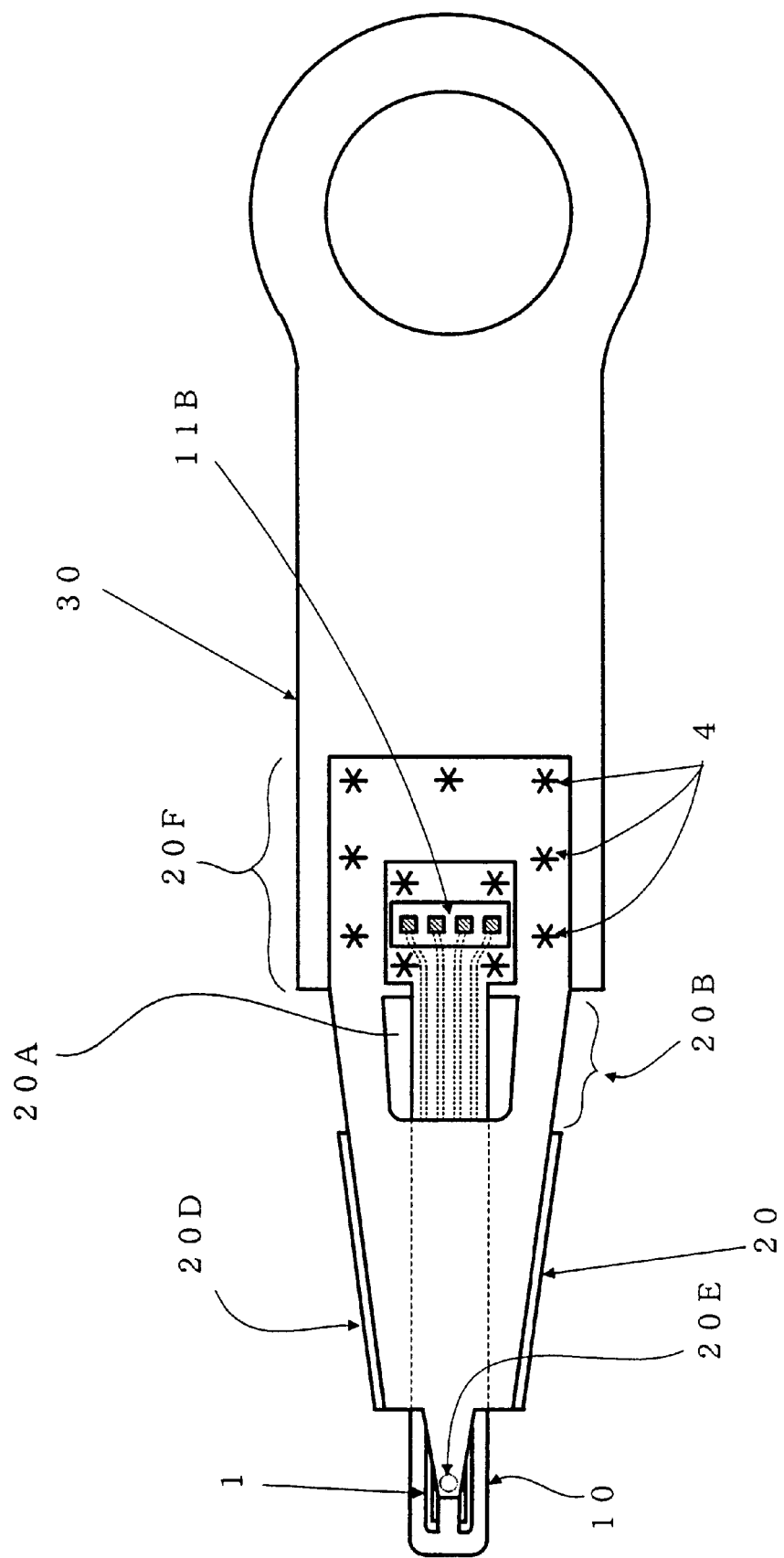
FIG. 5 illustrates the mechanism of FIG. 1 as viewed from its rear side, with no FPC being attached yet.

The first preferred embodiment of the support mechanism for the magnetic head slider of the present invention will now be described with reference to FIGS. 1–8. FIG. 1 is a vertical cross section of a support mechanism 110 for supporting a magnetic head slider of the present embodiment. FIG. 2 is an enlarged view of the portion denoted at X in FIG. 1. FIG. 3 illustrates the support mechanism as viewed from its rear side. FIG. 4 illustrates the mechanism as viewed from its disk side. FIG. 5 illustrates the mechanism as viewed from its rear side, with no FPC being attacked yet.

The support mechanism of Embodiment 1 for magnetic head sliders 110 has a substrate 11 of plate shape and further comprises a flexure 10 for supporting the magnetic head slider 1 at the distal end portion of the magnetic disk 2 side surface; a load beam 20 longitudinally joined to the substrate 11 of the flexure 10 for constituting a suspension; and an arm 30 for supporting a joining area 20F of the proximal end portion of the load beam 20 at its distal end portion.

The load beam 20 is provided with an aperture 20A extending from the disk side surface to the rear side surface of the load beam 20. The flexure 10 passes through the aperture. The flexure substrate 11 has the rear side surface of the distal end portion joined to the disk side surface of the distal end portion of the load beam 20 and has the disk side surface of its proximal end portion joined to the rear side surface of the proximal end portion of the load beam via suitable joining means such as welding. To position the flexure 10 relative to the load beam 20 for joining, positioning holes (not shown) are utilized, which holes are formed in the flexure substrate 11 and the load beam 20. A projection 20E projecting toward the flexure 10 side is formed on the distal end portion of the load beam 20, i.e., the projection 20E is formed on the corresponding portion of the load beam 20 to the head slider 1 mounting region of the flexure 10. In this region, the flexure 10 contacts the load beam 20 via the projection 20E only. Further, on the proximal end portion of the load beam 20, the disk side surface of the joining region 20F is joined to the rear side surface of the distal end portion of the arm 30, as shown in FIG. 1. A shaft hole 30A is formed in the distal end portion of the arm 30.

A load-bent region 20B is formed in the load beam 20 by subjecting the load beam 20 to load, so that the slider side (i.e., distal end) of the load beam 20 comes near a magnetic disk 2 than the arm 30 side (proximal end). Thereby, the load directed to the magnetic disc 2 is applied on the slider mounting region of the flexure 10 via the tip end of the projection 20E of the load beam 20. Preferably, the aperture 20A of the load beam 20 is located in the load-bent region 20B of the load beam 20. With this construction, it becomes possible to readily conduct a bending operation. Flange portions 20D are formed between the load-bent region 20B and the projection 20E to increase the stiffness of the load beam 20. Taking into consideration structural strength and the like, the load beam 20 and the arm 30 are preferably made of stainless steel. The load beam 20 is preferably 40 $\mu$m–80 $\mu$m in thickness, and the arm 30 is preferably 0.2 mm–0.4 mm in thickness.

Attached on the rear side surface of the proximal end portion of the load beam 20 and on the rear side surface of the arm 30 is an FPC substrate 40, i.e., the wiring structure for connection with the outside. The central portion of the FPC substrate 40 has a conductor pattern sandwiched between a base film and a coverlay film. No coverlay film is formed on the distal end portion of the load beam 20, with the FPC conductor layer being therefore exposed. The proximal end of the FPC substrate extends near a shaft hole 30A in the proximal end portion of the arm 30. In this region, too, the FPC conductor layer is exposed for connection with an external circuit.

As shown in FIG. 6, the flexure 10 comprises a flexure substrate 11 and a wiring structure consisting of an insulating layer 12, a conductor layer 13 and a protection layer 14 that are sequentially laminated on the flexure substrate 11. The flexure substrate 11 is preferably comprised of stainless steel of 15–40 $\mu$m in thickness. Formed on the distal end portion of the flexure substrate 11 is a gimbal 11A for reliably lifting the mounted slider 1 over the magnetic disk 2. Formed in the proximal end portion of the flexure substrate 11 are terminal openings 11B for exposing the later-described terminal pads.

The above-mentioned wiring structure comprises a polyimide insulating layer 12 of 5–15 $\mu$m in thickness, an Au/Ni/Cu/Ni/Au conductor multilayer 13 of about 5–15 $\mu$m in thickness and a polyimide protection layer 14 of 1–10 $\mu$m in thickness, these being sequentially formed on the flexure substrate 11.

The conductor layer 13 comprises slider pads 13A connected to terminals of the magnetic head by Au bonding or the like, terminal pads 13B to be connected to the FPC substrate attached on the arm 30 and a wiring structure 13C interconnecting the slider pads 13A and the terminal pads 13B. The insulating layer 12 is provided with terminal openings at the positions corresponding to the terminal pads 13B. The protection layer 14 is provided with slider openings 14A at the positions corresponding to the slider pads 13A of the conductor layer 13. The conductor layer 13 is insulated from the flexure substrate 11 by the insulating layer 12 and protected by the protection layer 14 except the slider openings 14A.

FIG. 7 is an enlarged view of a gimbal portion of the flexure 10. FIG. 7(a) is a view as seen from the disk side, FIG. 7(b) is a cross section taken along Line A-A' of FIG. 7(a), and FIG. 7(c) is a cross section taken along Line B-B' of FIG. 7(a). FIG. 8 is an enlarged view of a region surrounding the terminal pads. FIG. 8(a) is a view as seen from the disk side, FIG. 8(b) is a cross section taken along Line C-C' of FIG. 8(a), and FIG. 8(c) is a cross section taken along Line D-D' of FIG. 8(a).

As shown in FIG. 8, the terminal pads 13B of the conductor layer have their rear side surface exposed outside via the openings 12B of the insulating layer and the openings 11B of the flexure substrate. As shown in FIG. 2, the terminal pads 13B, having the rear side surface exposed outside as above, are connected, via a connection land 3 made of solder, to the exposed portion of an FPC conductor layer, the exposed portion being located in proximity of the load beam 20.

In the support mechanism for magnetic slider heads 110 of Embodiment 1, the wiring structure on the disk side surface of the flexure 10, which constitutes part of the suspension, can be connected to the FPC substrate attached on the rear side surface of the arm, without being folded as seen in the prior art. Thereby, it is possible to prevent the wiring structure from being damaged, thus improving the reliability of a wiring structure. Further, according to Embodiment 1, since it is not necessary to fold the wiring structure, it is possible to form the flexure pattern to a substantial rectangular shape having no extension therefrom, thereby arranging the flexure pattern densely in the sheet and reducing production cost.

Explained below is a method of producing the support mechanism 110 of Embodiment 1 for magnetic head sliders.

Figure 40:
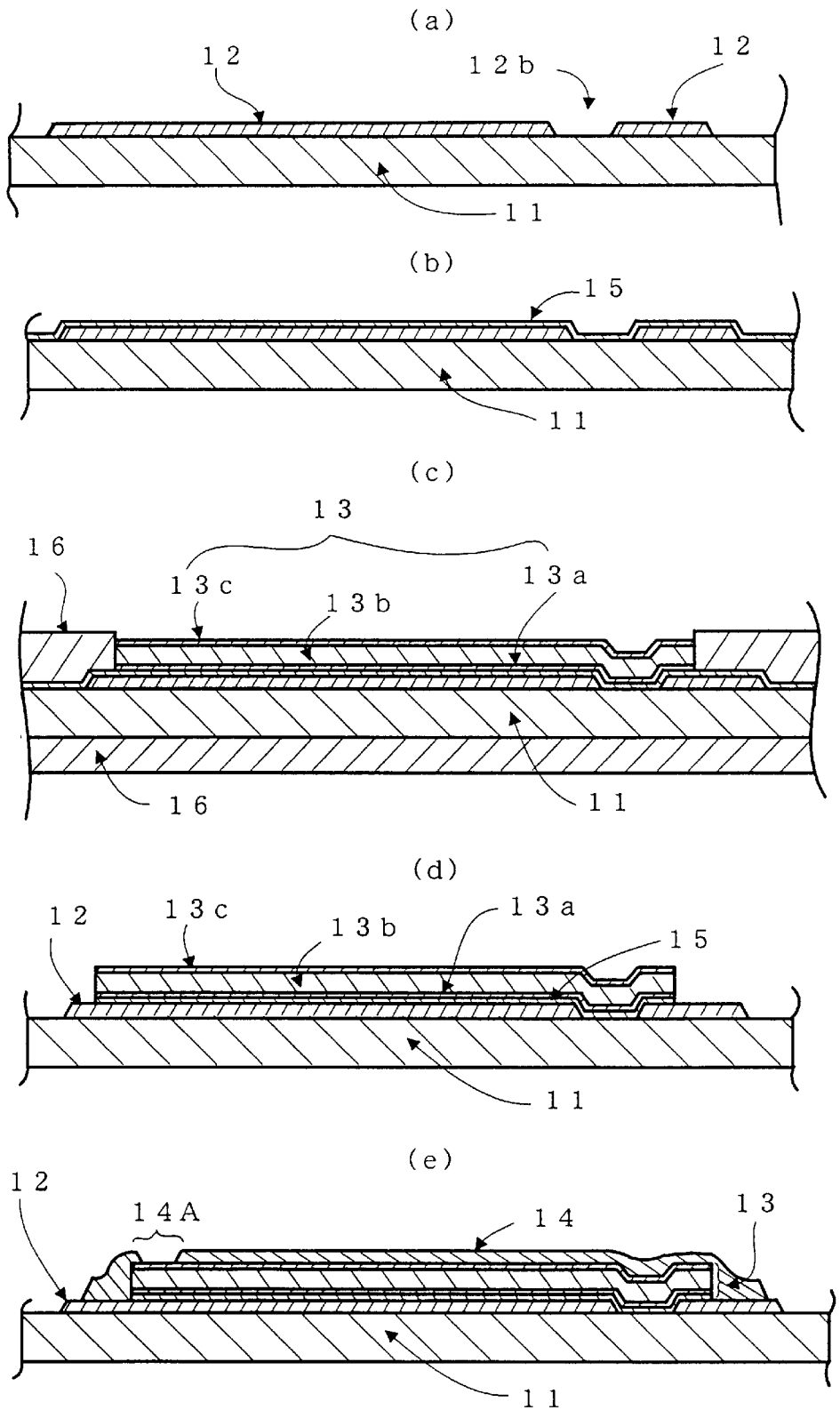
FIG. 40 illustrates part of the assembly process of the support mechanism for magnetic head sliders of FIG. 1.

Firstly, a method of producing the flexure 10 will be explained with reference to FIGS. 40 and 41. The entire surface of the flexure substrate 11 made of stainless steel and of about 15–40 µm in thickness is coated with photosensitive polyimide. Thereafter, the flexure substrate 11 is exposed to light and developed so as to form an insulating layer pattern 12 that has openings 12b at the positions corresponding to the terminal pads as shown in FIG. 40(a). Next, as shown in FIG. 40(b), formed on the entire surface of the insulating layer 12 by vacuum evaporation or sputtering is a feed layer 15 made of Ni film, Cu film, Cr film or the like and of about 50–300 nm in thickness.

As shown in FIG. 40(c), a first resist 16 is formed by photolithography on the disk side surface of the flexure substrate 11 except the region where the conductor layer 13 is to be formed, and also the first resist 16 is formed on the entire rear side surface of the flexure substrate 11. Using the feed layer 15 as an electrode, electroplating is conducted to sequentially laminate, on the feed layer 15 except the region where the first resist 16 is formed, a lower layer (etching stopper layer) 13a made of Au and of about 0.5–2 µm in thickness, an intermediate layer 13b made of Cu and of 3–10 µm in thickness and a disk side layer 13c made of Ni/Au laminate layer and of 1–3 µm in thickness to thereby form a conductor layer 13. The reason for employing Au for the surface layer 13c is that it is necessary to protect the conductor layer 13c exposed at the slider pad region 13A and to improve the Au ball bonding properties and the solder wettability of this region.

Next, after the first resist 16 is removed, the feed layer 15 is further subjected to etching except the region where the conductor layer 13 is formed, as shown in FIG. 40(d). Thereafter, the entire surface is coated with photosensitive polyimide and followed by light exposure and development operations, whereby the conductor layer 13 is exposed outside only at the positions where the slider openings 14A are formed, as shown in FIG. 40(e). The polyimide protection layer 14 is formed to cover the conductor layer 13 surface except the portions where the slider openings 14A are formed.

Next, as shown in FIG. 41(f), a second resist 17 is formed by photolithography on the rear side surface of the flexure substrate 11, the second resist 17 having terminal openings 17B formed at the positions corresponding to the terminal pads 13B. The second resist 17 is also formed on the entire disk side surface of the flexure substrate 11. Further, as shown in FIG. 41(g), the flexure substrate 11 made of stainless steel is subjected to etching with an etching liquid mainly containing ferric chloride using the second resist 17 as a mask. At this time, the feed layer 15 is also etched at the positions corresponding to the terminal pads 13B. However, the lower layer 13a of the conductor layer 13 is not etched because of being made of Au. Accordingly, the intermediate layer 13b and the surface layer 13c laminated on this lower layer 13a are not etched, either. Specifically, the lower layer 13a of the conductor layer 13 acts as an etching stopper.

Next, explained below is a method of assembling the flexure 10, the load beam 20, the arm 30 and the FPC 40. The load beam 20 is formed by the steps of etching a 40–80 µm stainless steel plate to have a predetermined shape, pressing the plate to form a projection 20E and the flange portions 20D. The arm 30 is produced by etching or punching a stainless steel plate of about 0.2–0.4 µm thickness to have a predetermined shape.

The method comprises i) contacting the rear side surface of the distal end portion of the flexure 10 with the disk side surface of the load beam 20 and ii) passing the proximal end portion of the flexure 10 through the aperture of the load beam 20 to contact the disk side surface of the proximal end portion of the flexure 10 with the rear side surface of the load beam 20 and iii) joining the flexure substrate 11 to the load beam 20 at a predetermined position.

Next, the method comprises Joining the joining region 20F of the proximal end portion of the load beam 20 to the rear side surface of the distal end portion of the arm 30. Thereafter, the load beam 20 is bent with load to form the load-bent region 20B so that the distal end of the load beam 20 comes near the magnetic disk 2 relative to the arm 30. Then, the FPC 40 is joined to the rear side surface of the joining region 20F of the load beam 20. Lastly, the connection land 3 is formed for connecting the terminal pads 13B of the flexure conductor layer to the conductor layer of the FPC substrate 40.

As described, according to the support mechanism 110 for magnetic head sliders of Embodiment 1, Au is employed for the lower layer 13a of the conductor layer 13. Further, the lower layer 13a is utilized as an etching stopper layer. Accordingly, it is possible to automatically stop the etching process of forming the terminal openings 11B In the flexure substrate 11 when the lower layer 13a appears. Thus, It is possible to form the terminal openings 13B, stably and with good yieldability, in the rear side surface of the flexure 10. By thus forming the terminal pads 13B on the rear side surface of the flexure 10, it is possible to connect the wiring structure on the disk side surface of the flexure 10 to the FPC on the rear side surface of the arm, without folding any portion of the wiring structure.

Further, in assembling the slider support mechanism 110 of Embodiment 1, it is possible to eliminate the need for the step of folding the wiring structure on the disk side surface of the flexure constituting part of the suspension, thereby simplifying the whole assembly procedure and reducing assembling cost. Further, according to the present invention, it is possible to prevent the wiring structure from being damaged during pressing with a mold.

In the above-described method of producing a flexure, the lower layer 13a of the wiring layer 13 is a single Au layer, but may be made of two layers of Au/Ni. Thereby, it is possible to prevent mutual diffusion reaction between the lower layer 13a, i.e., the Au layer and the intermediate layer 13b, i.e., the Cu layer and to provide good adhesion between both layers.

According to the present embodiment, after the load beam 20 is joined to the flexure 10, the load beam 20 is joined to the arm 30. Conversely, after the load beam 20 is joined to the arm 30, the flexure 20 may be joined to the load beam 20. By this converse procedure, it is possible to join the load beam 20 to the arm 30 on an appropriate position of the joining region 20F, for example, even on the portion where the load beam 20 and flexure 10 are laminated on each other, thereby joining the load beam 20 to the arm 30 more strongly.

Embodiment 2

Figure 9:
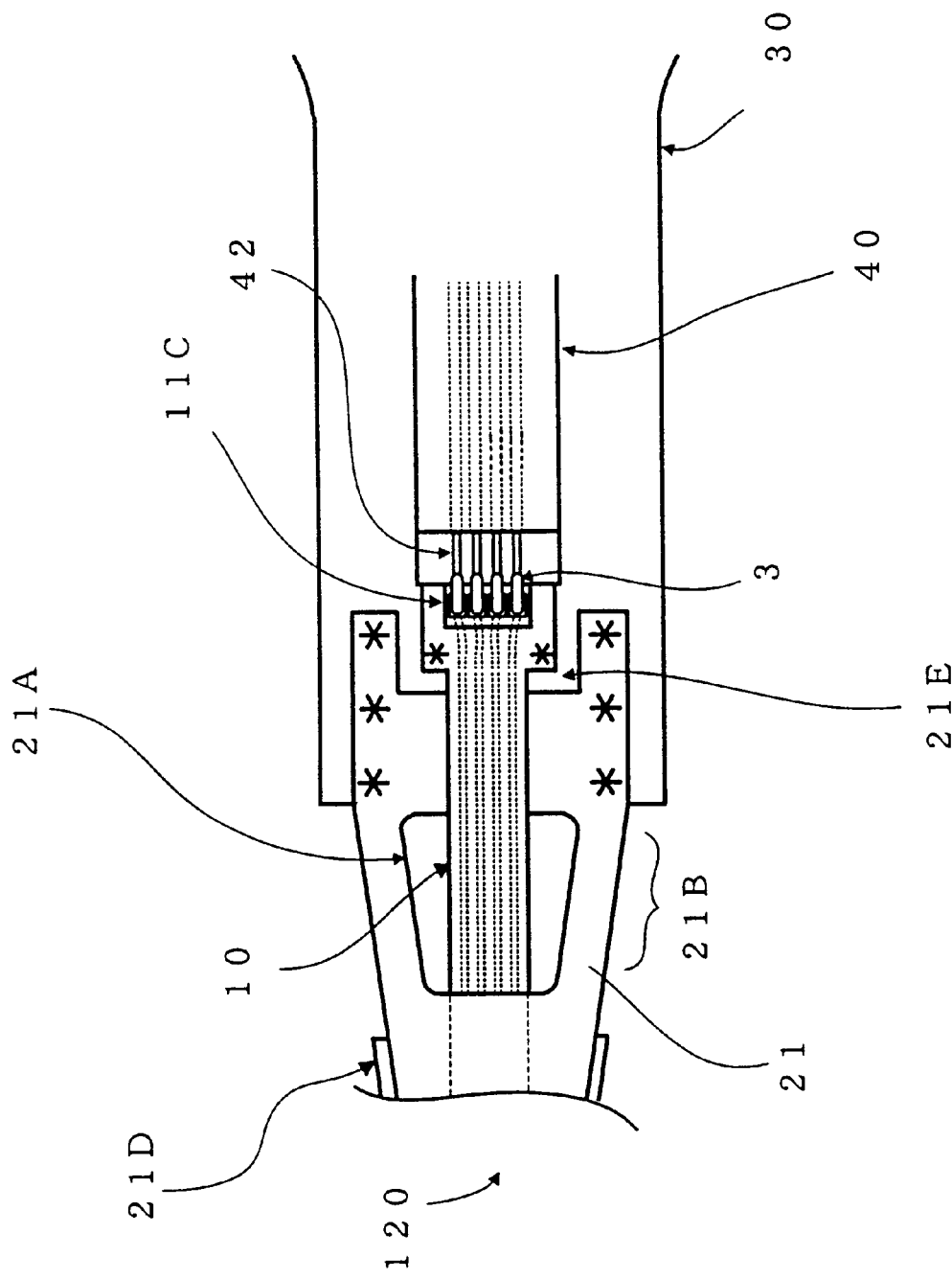
FIG. 9 illustrates a support mechanism for magnetic head sliders of the second embodiment of the present invention, as viewed from its rear side.

The second embodiment of the present invention will now be explained with reference to FIG. 9. FIG. 9 illustrates the support mechanism 120 of Embodiment 2 for magnetic head sliders as viewed from its rear side. The same parts as in the previous embodiment or the equivalent parts thereof are denoted by the same reference numerals, and the explanations therefor are omitted below.

In lieu of the load beam 20 of Embodiment 1, the support mechanism 120 of Embodiment 2 for magnetic head sliders employs a load beam 21 having a cutout 21E formed at its proximal end, the cutout being opened toward the proximal end, wherein the flexure substrate 11 is directly joined, at the portions 11C corresponding to the terminal pads 13, to the rear side surface of the arm 30.

Embodiment 2 has only two layers, i.e., the flexure 10 and the FPC substrate 20 disposed on each other in the Joining region between the terminal pads 13B and the FPC substrate 40 on the rear side surface of the arm 30, whereby it is possible to more reduce the thickness of the slider support mechanism than employing the three layer structure of the load beam 10, the flexure 10 and the FPC 40 as in Embodiment 1. Accordingly, it is possible to reduce each distance between a number of magnetic disks stacked in a rigid disk drive, thereby downsizing the whole drive in addition to the advantages of Embodiment 1.

As described, Embodiment 2 employs the load beam 21 provided with the cut out 21 at its proximal end within which the terminal pads 13B are located. Alternatively, it is also possible to use the load beam 20 of Embodiment 1, extend the flexure wiring structure beyond the proximal end of the load beam 20 and join the flexure substrate directly to the rear side surface of the arm at the positions corresponding to the terminal pads, thereby obtaining the same advantages as in Embodiment 2.

Embodiment 3

Figure 10:
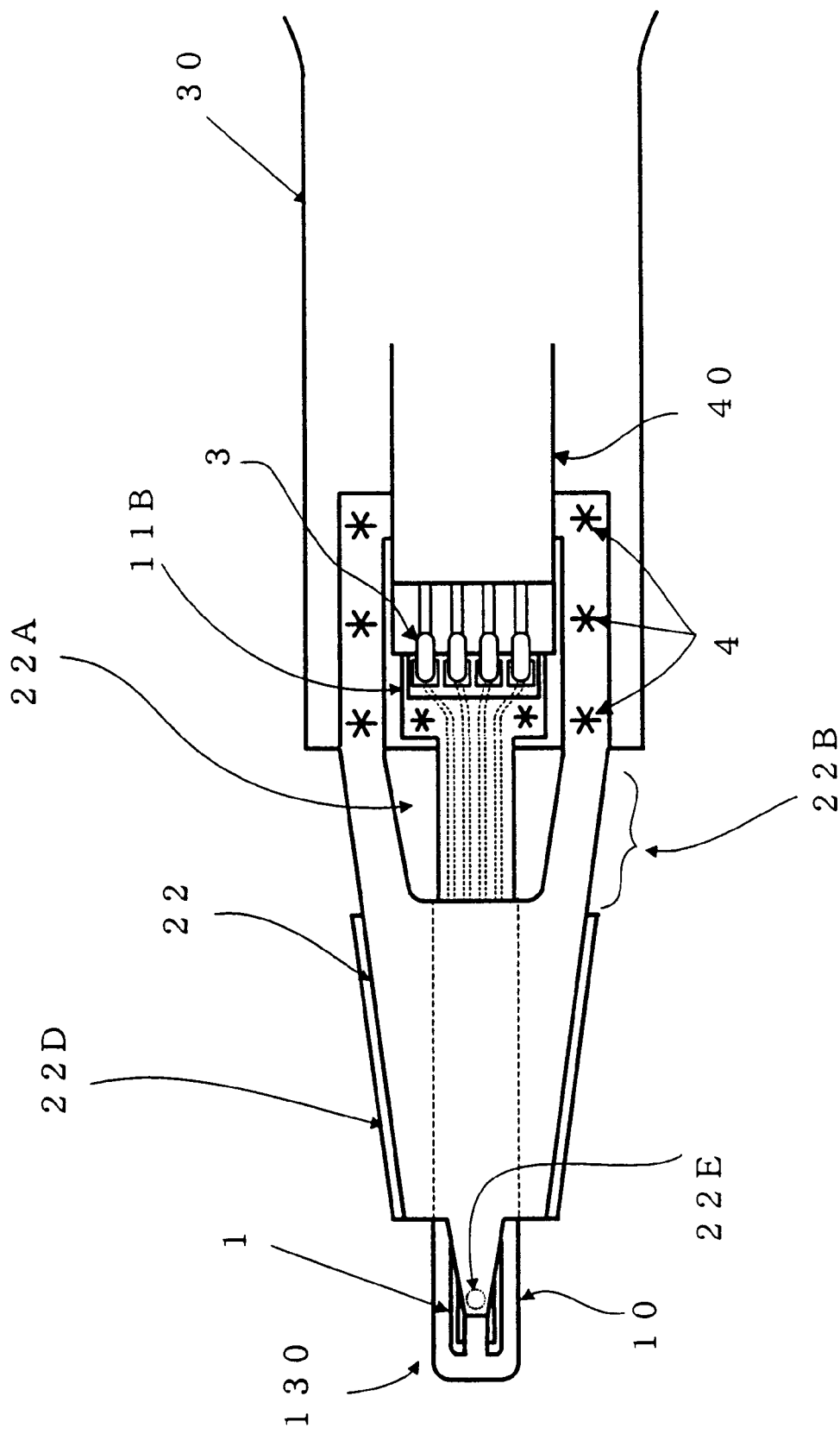
FIG. 10 illustrates a support mechanism for magnetic head sliders of the third embodiment of the present invention, as viewed from its rear side.
Figure 11:
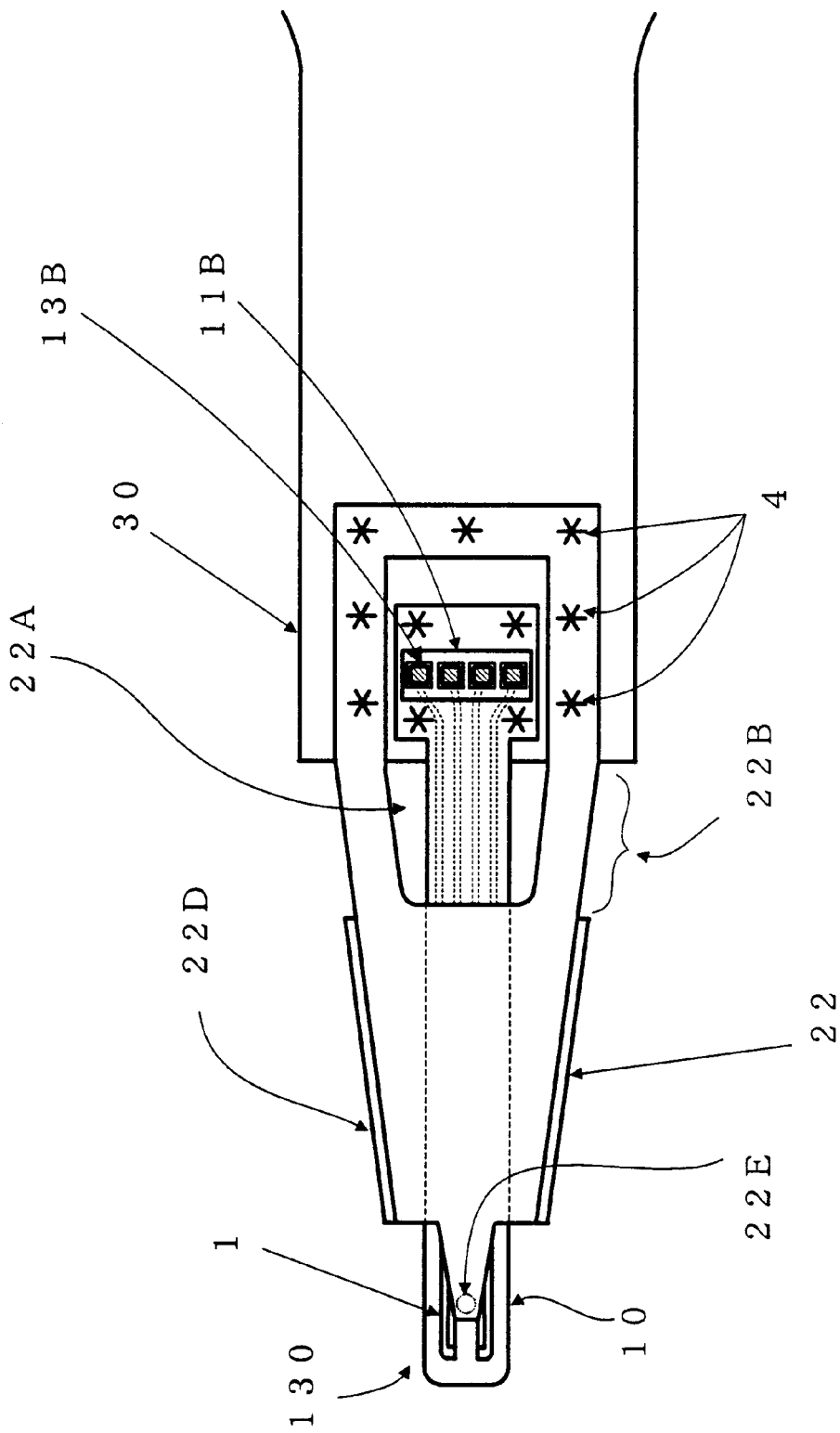
FIG. 11 illustrates the support mechanism for magnetic head sliders of FIG. 10 as viewed from its rear side, with no FPC being attached yet.

The third embodiment of the present invention will now be explained with reference to FIGS. 10 and 11. FIG. 10 illustrates a support mechanism 130 of Embodiment 3 for magnetic head sliders, as viewed from its rear side. FIG. 11 illustrates the support mechanism 130 for magnetic head sliders as viewed from its rear side, with no FPC being attached yet. The same parts as in the previous embodiment or the equivalent parts thereof are denoted by the same reference numerals, and the explanations therefor are omitted below.

As shown in FIGS. 10 and 11, Embodiment 3 employs a load beam 22 in lieu of the load beam 20 of Embodiment 1, which load beam 22 is provided with an aperture 22A that extends beyond the distal end of the arm. The flexure substrate 11C is directly joined, at the positions corresponding to the terminal pads 13B, to the rear side surface of the arm 30 so that the terminal pads 13B of the flexure is located within the aperture 22A of the load beam 22.

In addition to the advantages described in Embodiment 1, according to the support mechanism for magnetic head sliders 130 of Embodiment 3, it is possible to attain the same advantages as those of Embodiment 2, i.e., to downsize the slider support mechanism by employing the two layer structure consisting of the flexure 10 and the FPC substrate 40 on the rear side surface of the arm 30.

According to Embodiment 3, it is not necessary to pass the flexure 10 through the aperture 22A in the load beam 20 in order to lay the flexure 10 over the rear side surface of the load beam 22, thereby reducing the bending curvature of the flexure 10. Accordingly, it is possible to prevent the flexure wiring structure from being damaged with sudden contact with the edge of the load beam aperture 22A.

Further, according to the present embodiment, since it is not necessary to pass the flexure 10 through the load beam aperture 22A, both the load beam 22 and the flexure 10 can be joined to the rear side surface of the arm 30 after the flexure 10 is welded to the disk side surface of the load beam 22. Thereby, it is possible to simplify the assembly process and therefore reduce the production cost.

Embodiment 4

Figure 12:
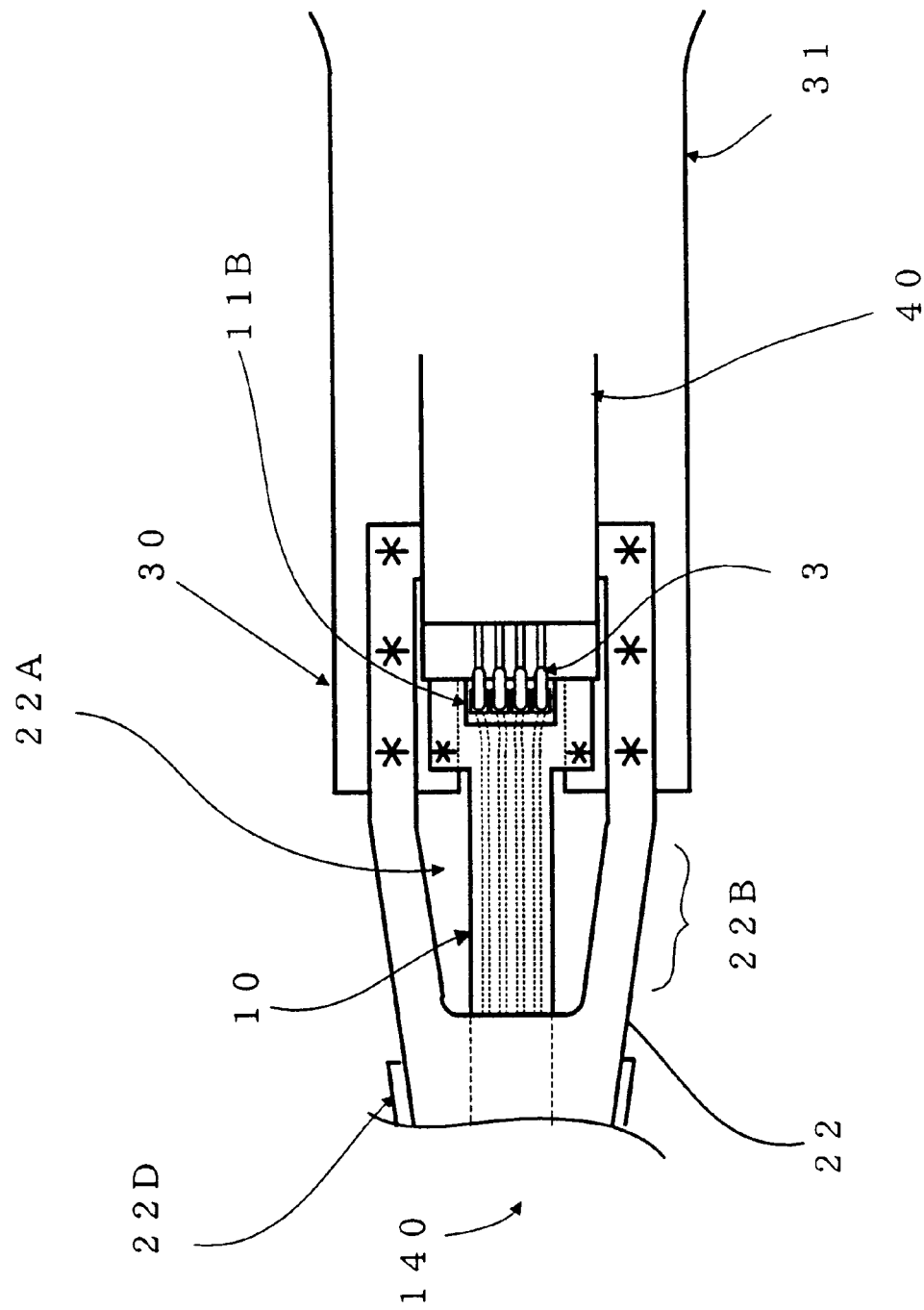
FIG. 12 illustrates a support mechanism for magnetic head sliders of the fourth embodiment as viewed from its rear side.
Figure 13:
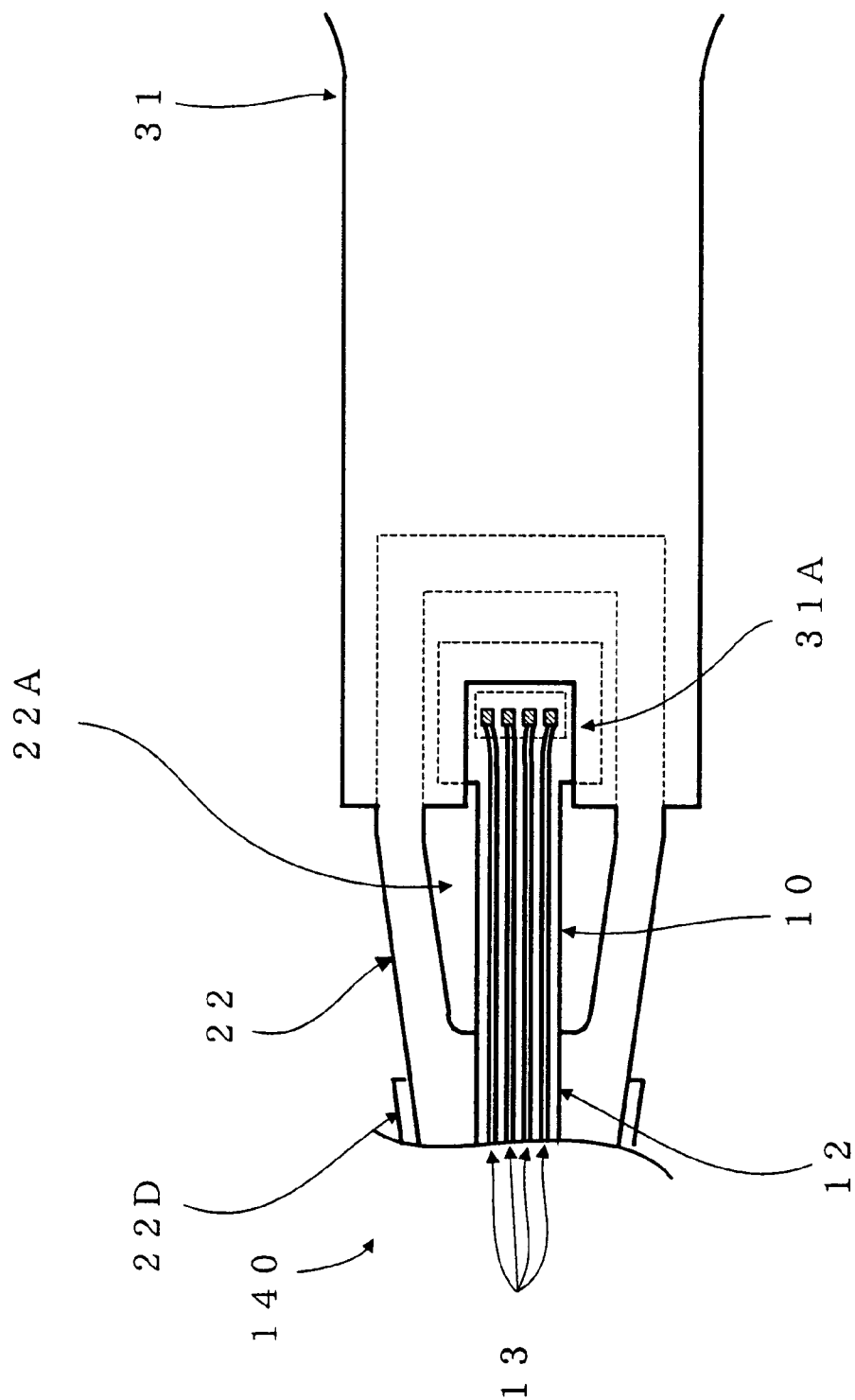
FIG. 13 illustrates the support mechanism for magnetic head sliders of FIG. 12, as viewed from its disk side.
Figure 14:
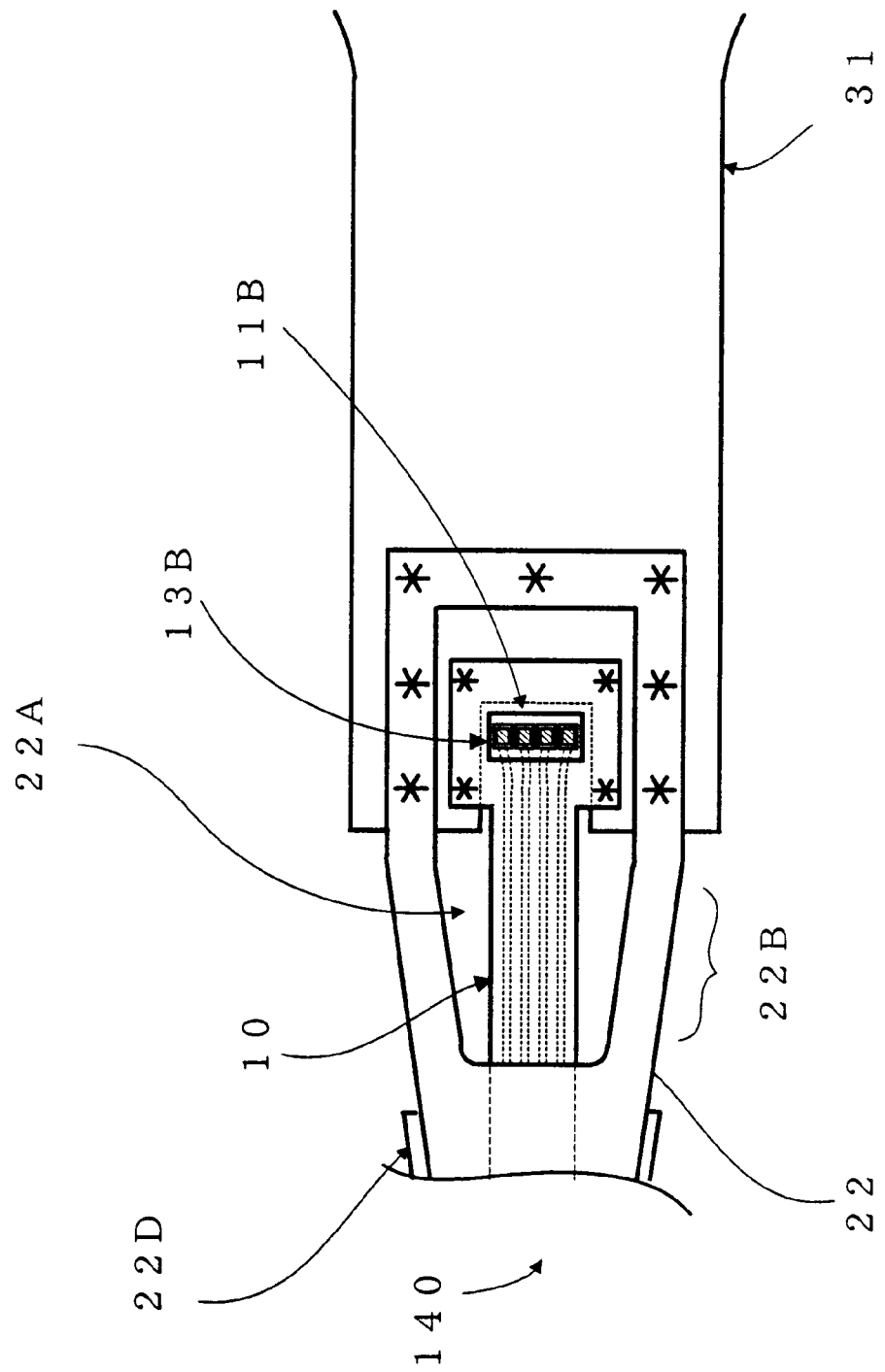
FIG. 14 illustrates the support mechanism for magnetic head sliders of FIG. 12 as viewed from its rear side, with no FPC being attached yet.

The forth embodiment of the present invention will now be explained below with reference to FIGS. 12–14. FIG. 12 illustrates a support mechanism 140 of Embodiment 4 for magnetic head sliders as viewed from its rear side. FIG. 13 illustrates the mechanism 140 as viewed from its disk side. FIG. 14 illustrates the mechanism 140 as viewed from its rear side, with no FPC being attached yet. The same parts as in the previous embodiment or the equivalent parts thereof are denoted by the same reference numerals, and the explanations therefor are omitted below.

As shown in FIGS. 12–14, in lieu of the arm 30 of Embodiment 3, Embodiment 4 employs an arm 31 provided, at its distal end, with a cutout 31A opened toward the distal end. The flexure substrate 11C is directly joined, at the positions corresponding to the terminal pads 13B, to the rear side surface of the arm 31 in such a manner that the terminal pads 13B be located within the cutout 31A of the arm 31.

In addition to the same advantages as those of Embodiment 3, according to the support mechanism 140 of Embodiment 4 for magnetic head sliders, it is possible to prevent the wiring structure on the flexure 10 from contacting the distal edge of the arm 31, thereby preventing the wiring structure from being damaged.

Embodiment 5

Figure 15:
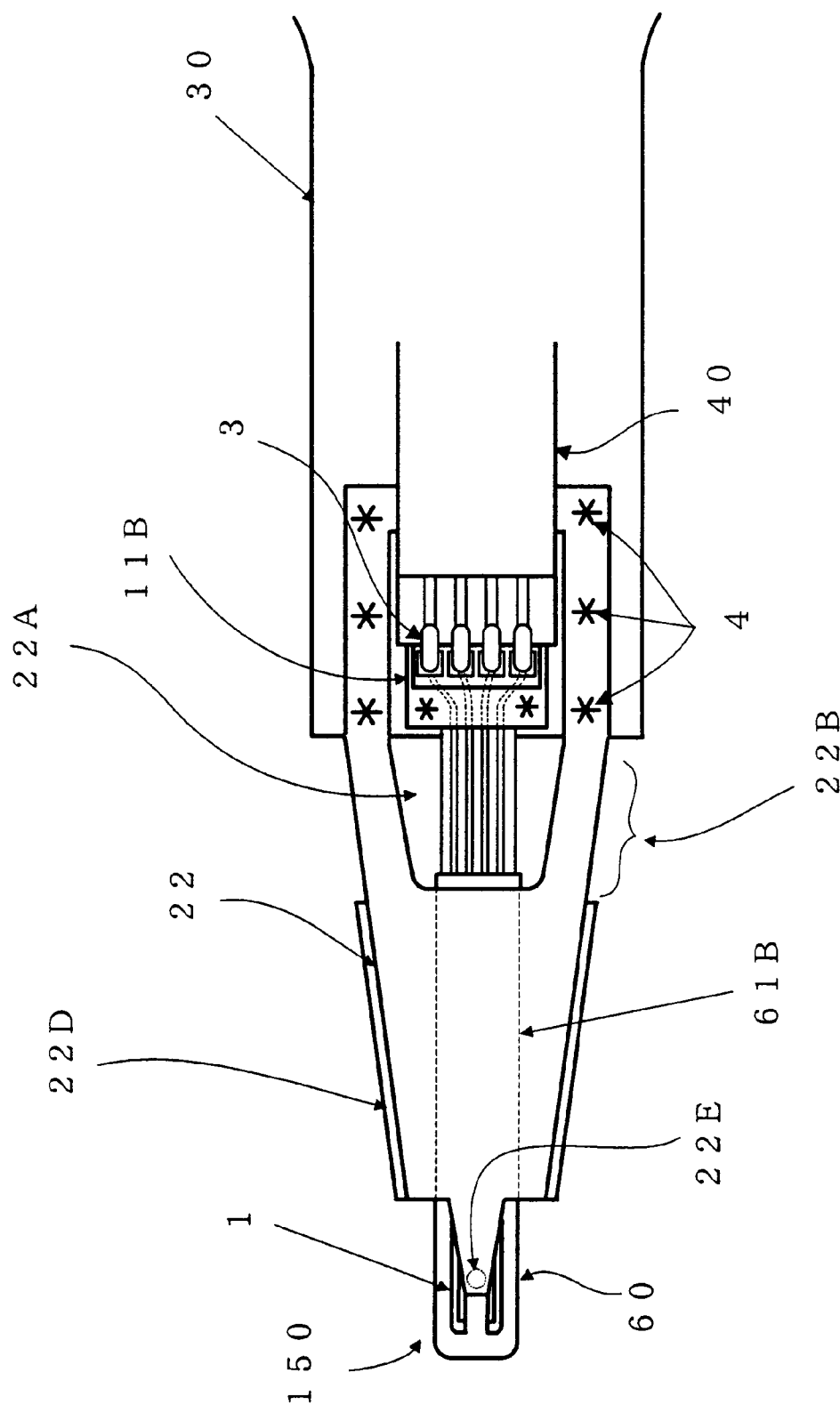
FIG. 15 illustrates a support mechanism for magnetic head sliders of the fifth embodiment of the present invention as viewed from its rear side.

The fifth embodiment of the present invention will now be explained below with reference to FIG. 15. FIG. 15 illustrates a support mechanism 150 of Embodiment 5 for magnetic head sliders as viewed from its rear side. The same parts as in the previous embodiment or the equivalent parts thereof are denoted by the same reference numerals, and the explanations therefor are omitted below.

As shown in FIG. 15, in lieu of the flexure 10 of Embodiment 3, Embodiment 5 employs a flexure 60 that consists of only wiring at the position corresponding to the load-bent region 22B of the load beam 22.

Explained below is a method of producing the flexure 60 of the present embodiment. Firstly, a wiring structure is produced in accordance with the steps shown in FIGS. 40(a)–40(e). Next, as shown in FIG. 42(a), formed on the rear side surface of a flexure substrate 61 by photolithography is a second resist 18 that has terminal pad openings 18B at the positions corresponding to the terminal pads 13B and has openings 18C at the position corresponding to the load-bent region 22B of the load beam 22. The second resist 18 is also formed on the entire disk side surface of the flexure 61. The flexure substrate 61 is etched with an etching liquid containing ferric chloride as an active ingredient and using the second resist 18 as a mask. Thereby, the portions corresponding to the terminal pads and the portion corresponding to the load-bent region are removed from the flexure substrate 61 as shown in FIG. 42(b). Thus, the flexure 60 which consists of only wiring at these portions can be produced.

According to the thus constructed slider support mechanism 150 of Embodiment 5, the flexure 60 has no flexure substrate 61 at the position corresponding to the load-bent region of the load beam 22 and is formed of only wiring at that portion. Accordingly, it is possible to prevent the load generated by the load beam 22 being bent from being affected by the flexure 60, thereby generating stable load.

As described, the present embodiment employs the flexure 60 in Embodiment 3 in lieu of the flexure 10. It is also possible to employ the flexure 60 in Embodiment 4 in lieu of the flexure 10.

Embodiment 6

Figure 16:
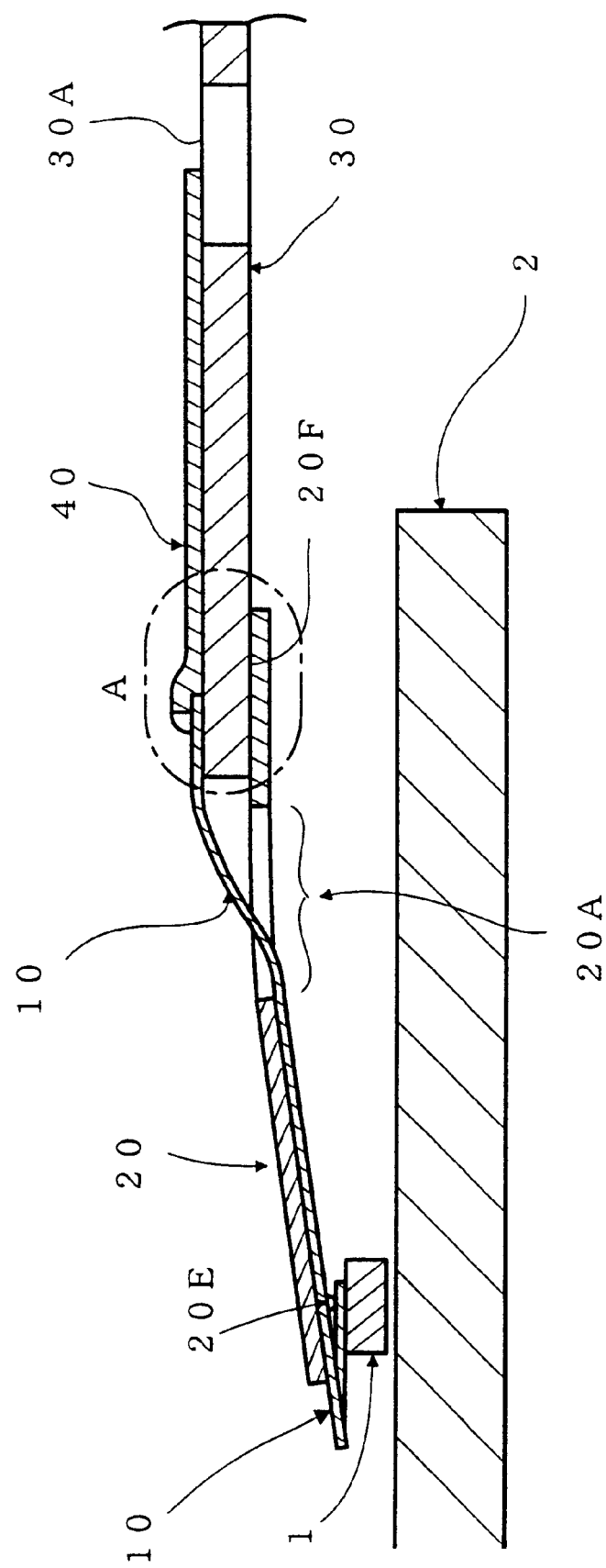
FIG. 16 is a vertical cross section of the support mechanism for magnetic head sliders of the sixth embodiment of the present invention.
Figure 17:
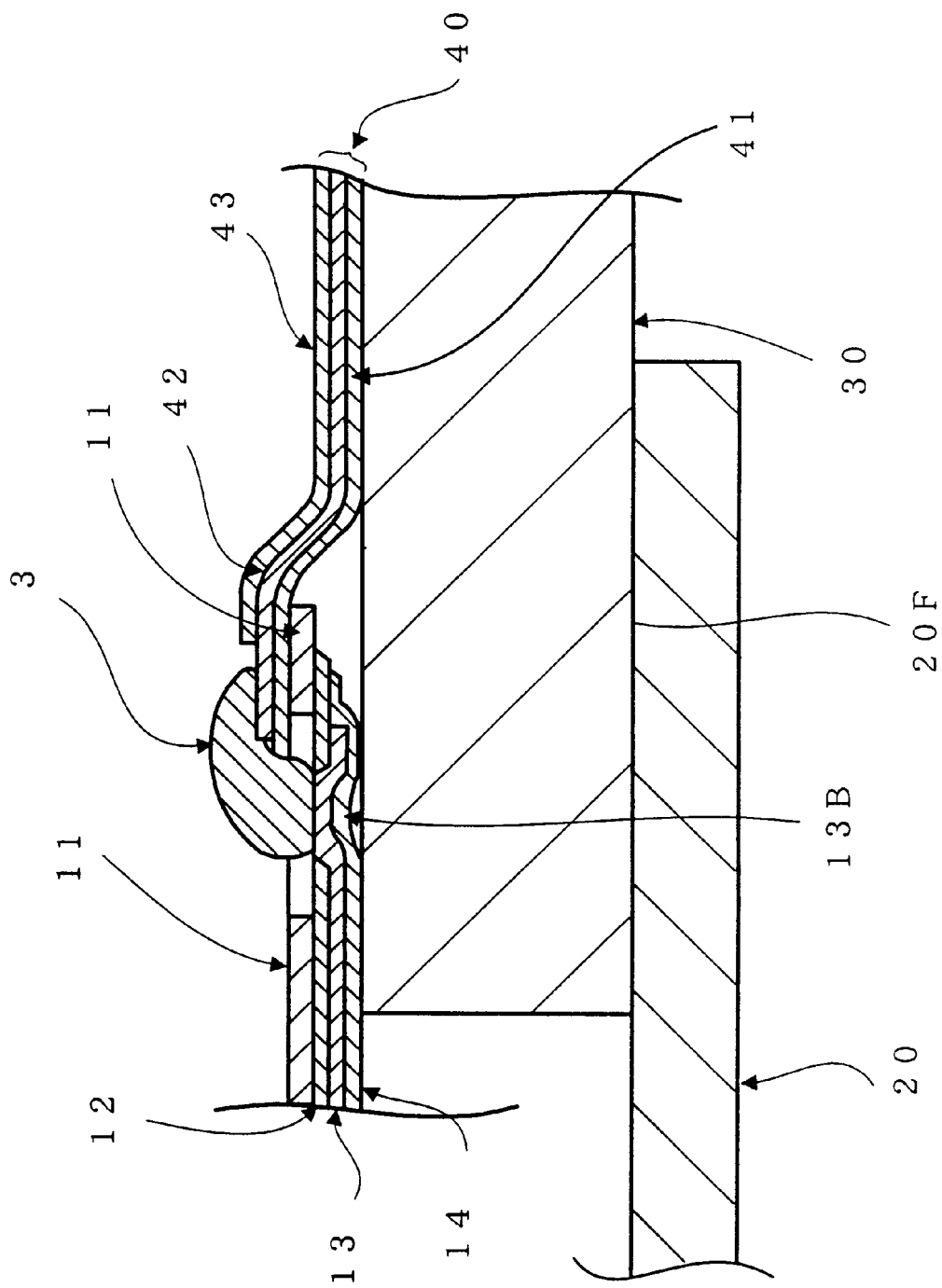
FIG. 17 is an enlarged cross section of the portion denoted at A in FIG. 16.
Figure 18:
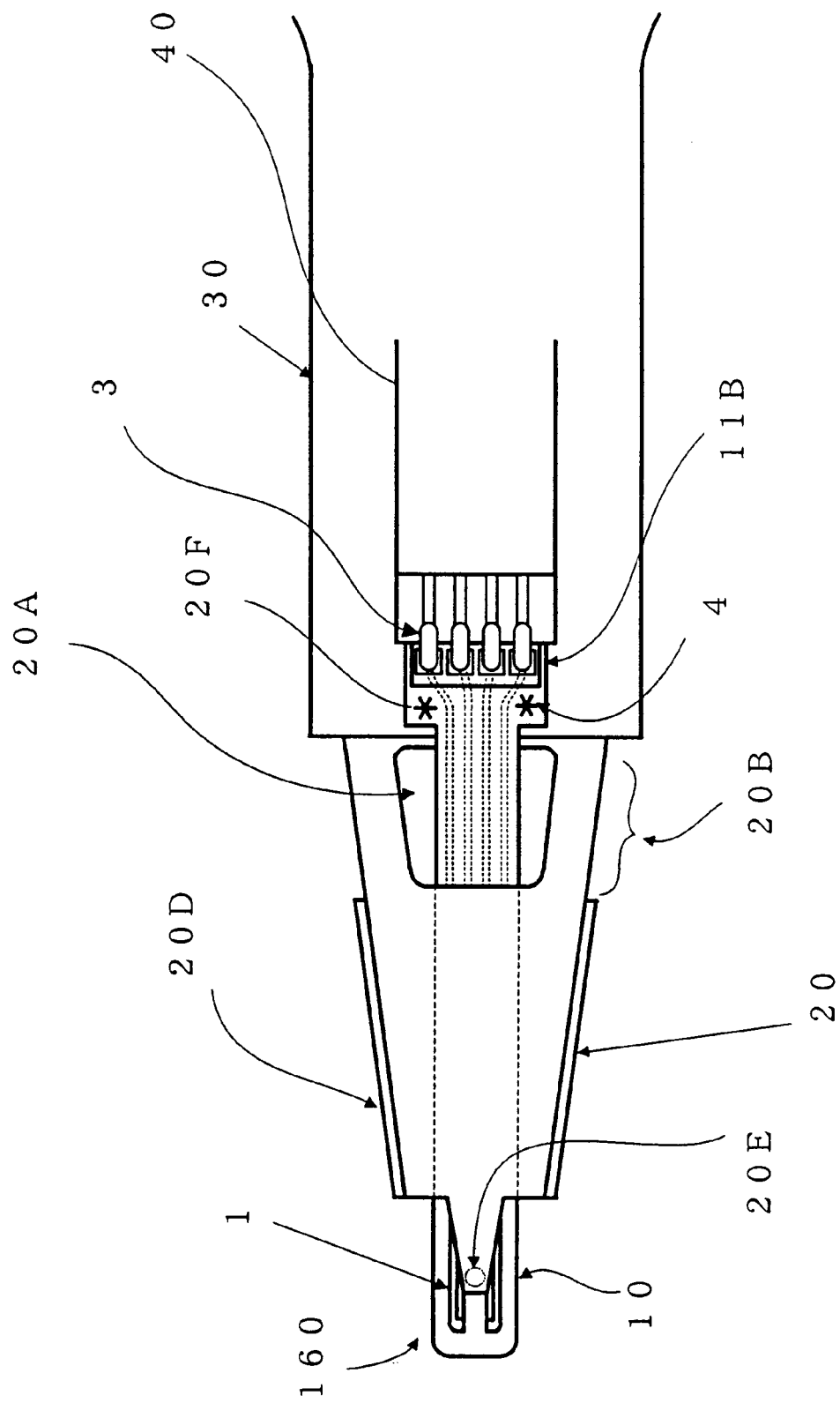
FIG. 18 illustrates the support mechanism for magnetic head sliders of FIG. 16 as viewed from its rear side.
Figure 19:
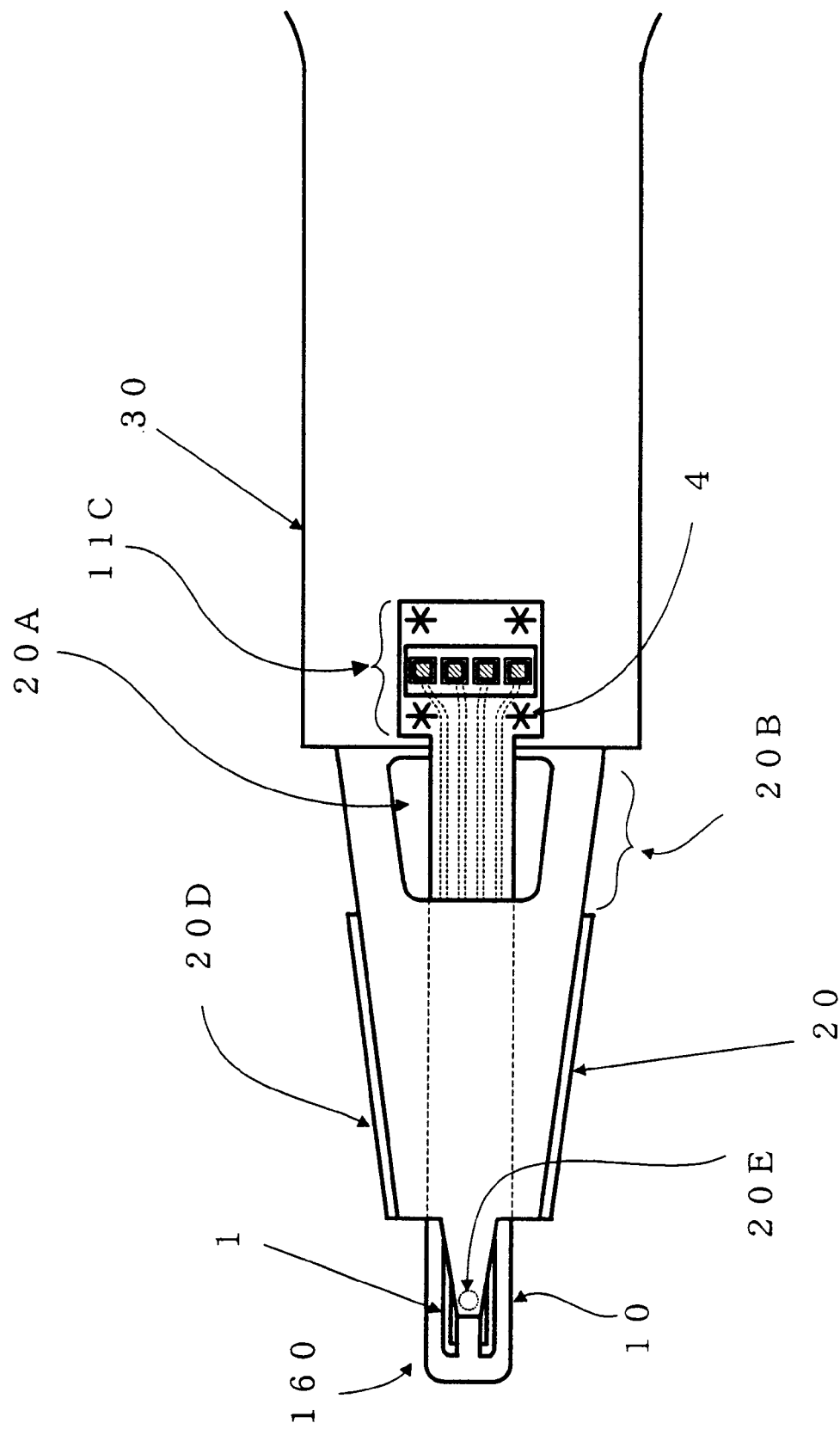
FIG. 19 illustrates the support mechanism for magnetic head sliders of FIG. 16 as viewed from its rear side, with no FPC being attached yet.

The sixth embodiment will now be explained below with reference to FIGS. 16–19. FIG. 16 is a vertical cross section of a support mechanism 160 of Embodiment 6 for magnetic head sliders. FIG. 17 is an enlarged cross section of the portion denoted at A in FIG. 16. FIG. 18 illustrates the mechanism 160 as viewed from its rear side. FIG. 19 illustrates the mechanism 160 as viewed from its rear side, with no FPC 40 being attached yet. The same parts as in the previous embodiment or the equivalent parts thereof are denoted by the same reference numerals, and the explanations therefor are omitted below.

As shown in FIGS. 16–19, Embodiment 6 employs the same parts of the previous embodiments. Embodiment 6 has the joining region 20F (located on the proximal end portion of the load beam 20) to the disk side surface of the arm 30 and has the flexure substrate 11 joined, at the positions 11C corresponding to the terminal pads 13B, to the rear side surface of the arm 30.

The thus constructed Embodiment 6 can also attain the same advantages as those of Embodiment 1.

Embodiment 7

Figure 20:
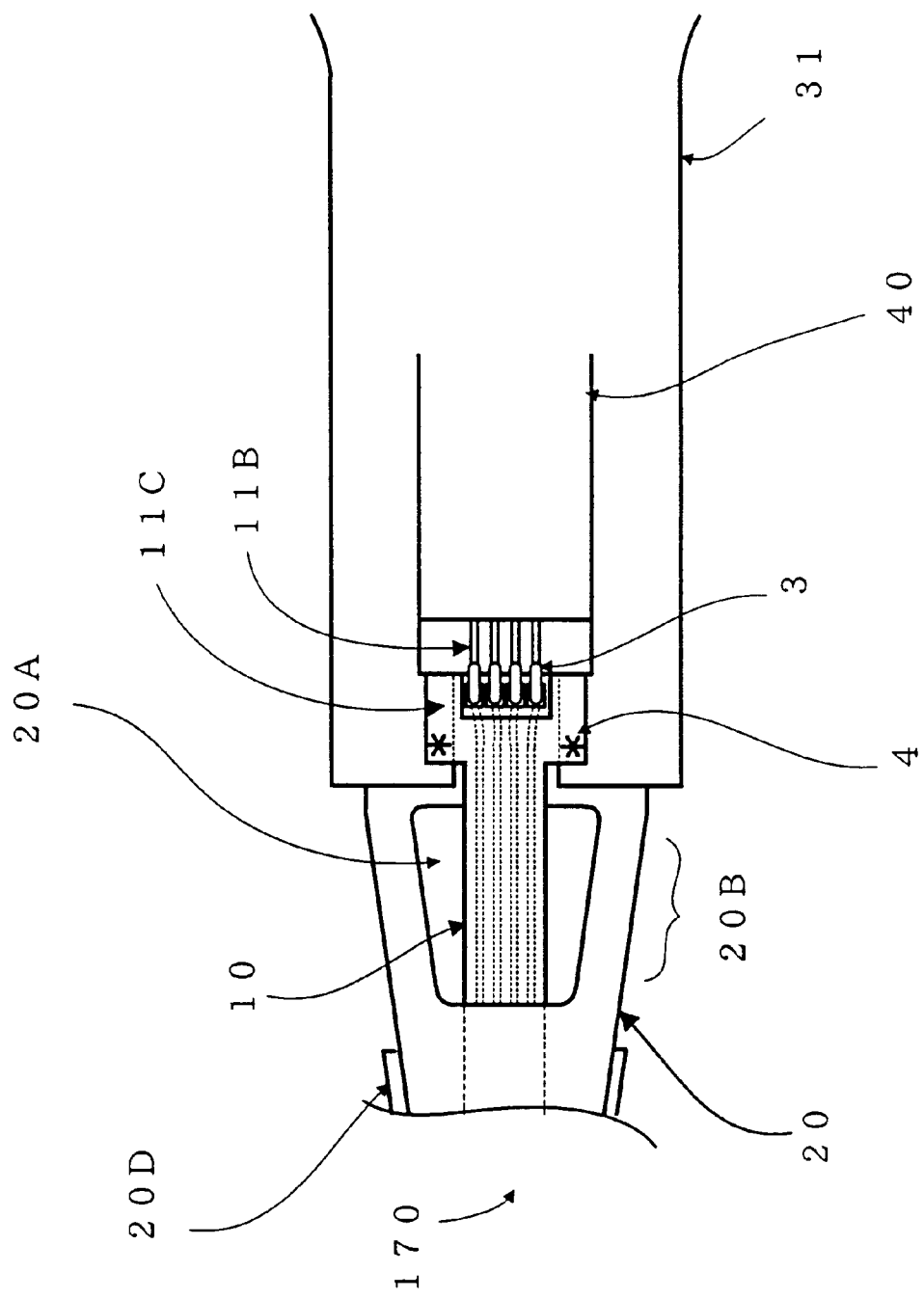
FIG. 20 illustrates a support mechanism for magnetic head sliders of the seventh embodiment as viewed from its rear side.
Figure 21:
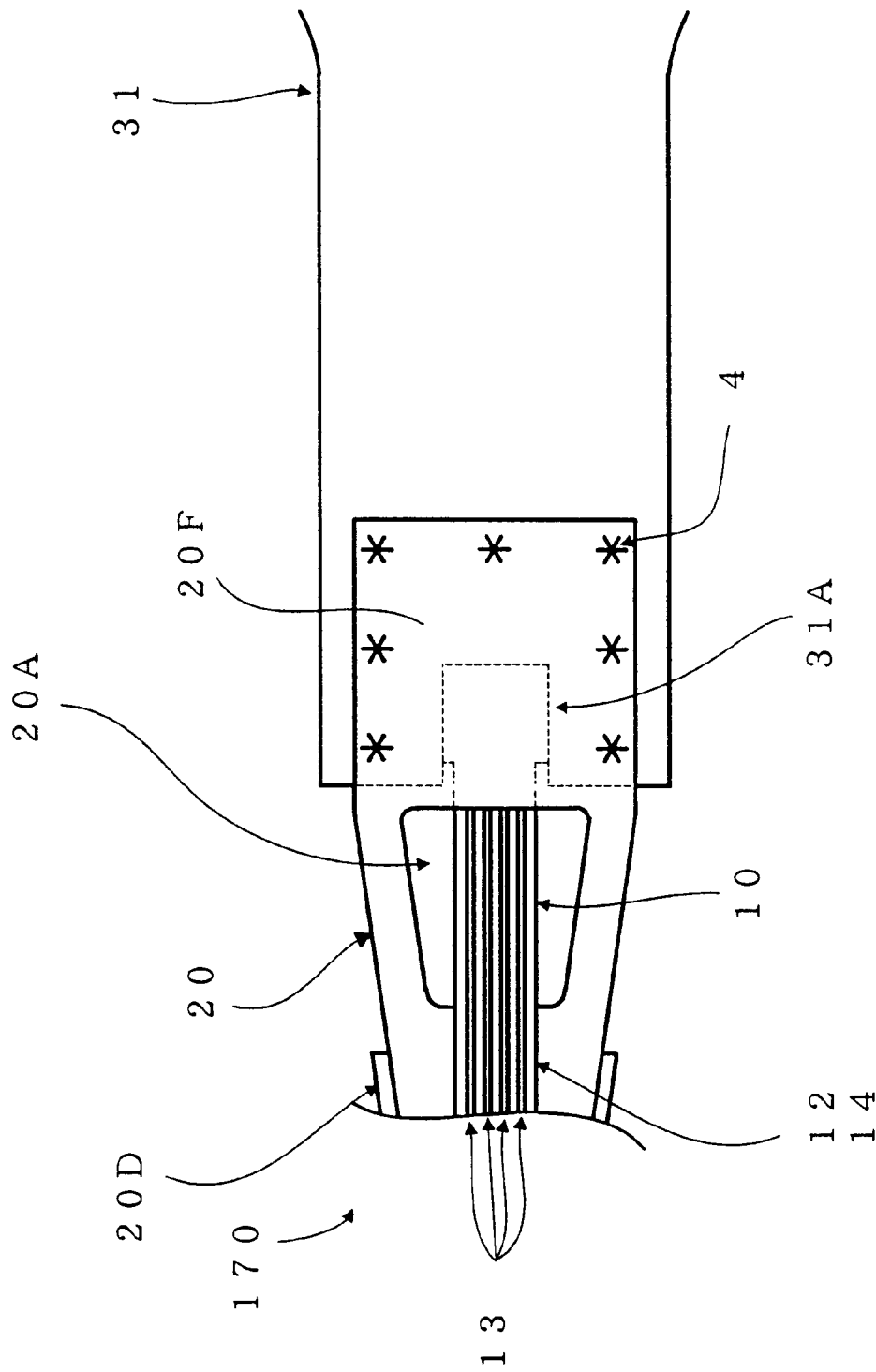
FIG. 21 illustrates the support mechanism for magnetic head sliders of FIG. 20 as viewed from its disk side.
Figure 22:
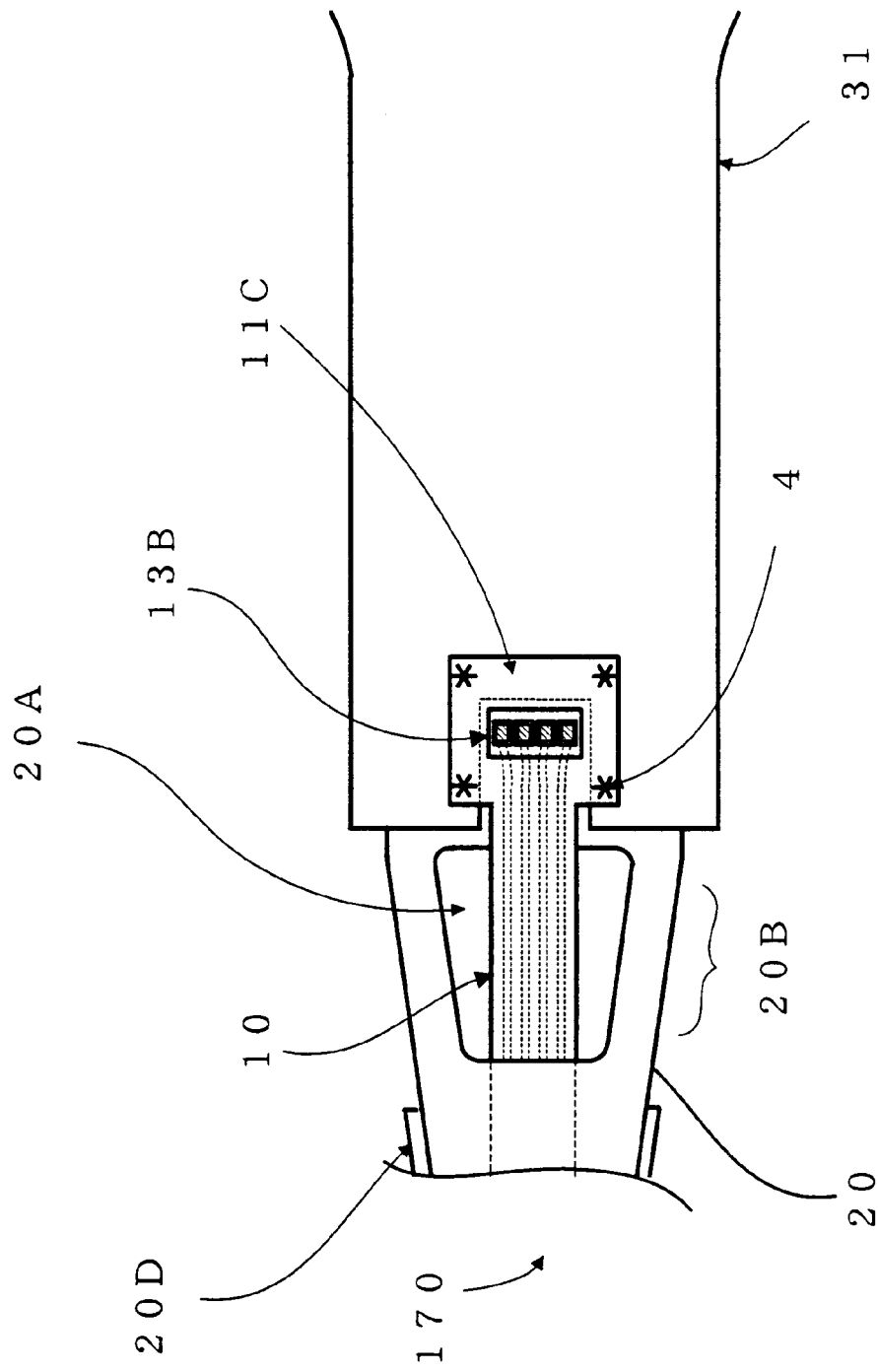
FIG. 22 illustrates the support mechanism for magnetic head sliders of FIG. 20 as viewed from its rear side, with no FPC being attached yet.

The seventh embodiment of the present invention will now be explained below with reference to FIGS. 20–22. FIG. 20 illustrates a support mechanism 170 of Embodiment 7 for magnetic head sliders, as viewed from its rear side. FIG. 21 illustrates the mechanism 170 as viewed from its disk side. FIG. 22 illustrates the mechanism 170 as viewed from its rear side, with no FPC being attached yet. The same parts as in the previous embodiment or the equivalent parts thereof are denoted by the same reference numerals, and the explanations therefor are omitted below.

As shown in FIGS. 20–22, in lieu of the arm 30, Embodiment 7 employs an arm 31 in Embodiment 6, the arm 31 being provided at its distal end with a cutout 31A of Embodiment 4. The flexure substrate 11 is directly joined, at the positions corresponding to the terminal pads 13B, to the rear side surface of the arm 31 in such a manner that the terminal pads 13B be located within the cutout 31A of the arm 31.

In addition to the advantages of Embodiment 6, according to Embodiment 7, it is possible to prevent the flexure wiring structure from contacting the distal edge of the arm 30 and therefore from being damaged.

Embodiment 8

Figure 23:
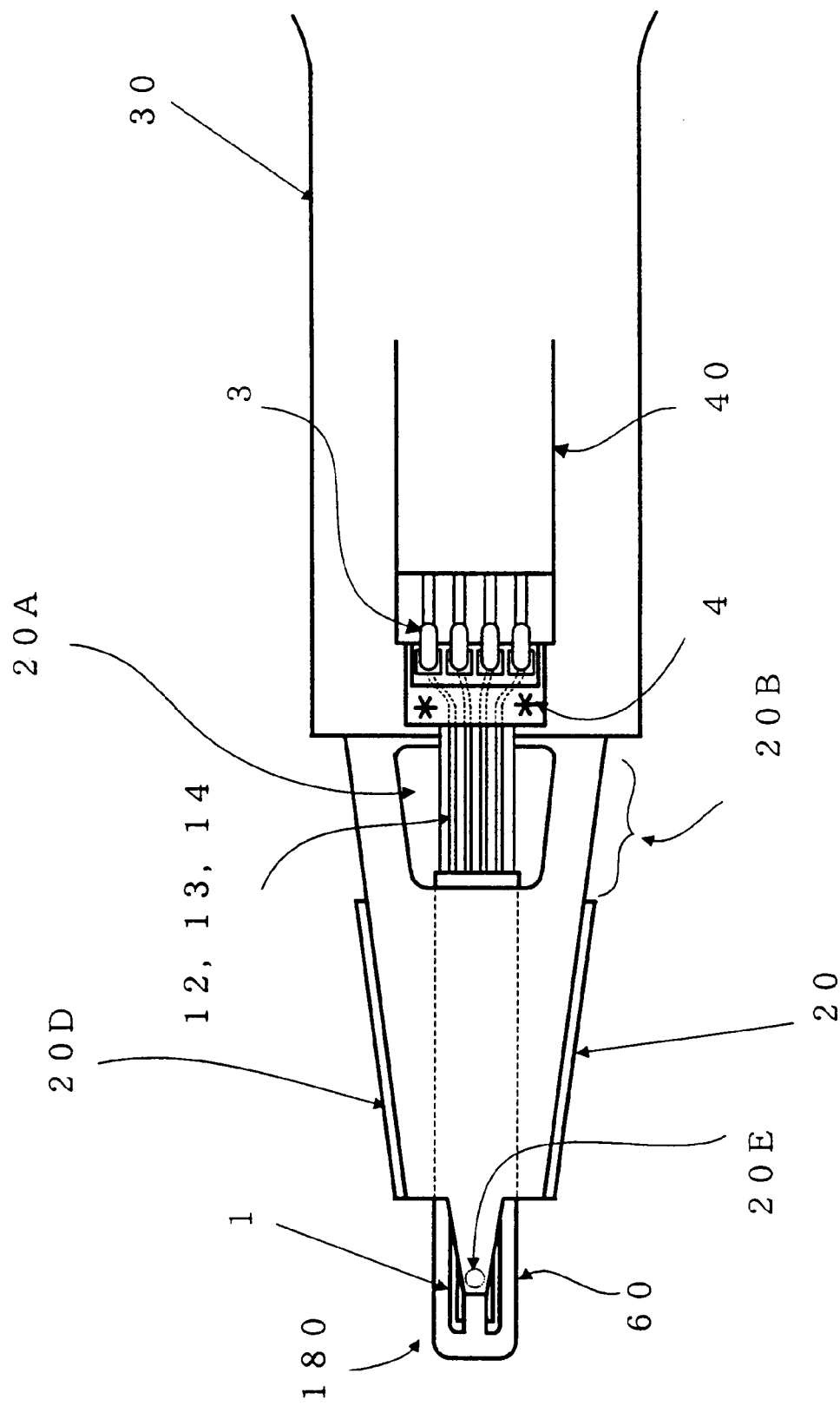
FIG. 23 illustrates a support mechanism for magnetic head sliders of the eighth embodiment of the present invention, as viewed from its rear side.

The eighth embodiment of the present invention will now be explained below with reference to FIG. 23. FIG. 23 illustrates a support mechanism for magnetic head sliders 180 of Embodiment 8 as viewed from its rear side. The same parts as in the previous embodiment or the equivalent parts thereof are denoted by the same reference numerals, and the explanations therefor are omitted below.

As shown in FIG. 23, in lieu of the flexure 10 of Embodiment 6, Embodiment 8 employs a flexure 60 in Embodiment 6, which flexure consists of only wiring at the position corresponding to the load-bent region 20B of the load beam 20.

According to the thus constructed Embodiment 8, since the flexure 60 has no flexure substrate 61 at the position corresponding to the load-bent region of the load beam 20 and consists of only wiring at that position, the load generated by bending the load beam 20 can be prevented from being affected by the flexure 60, thereby reducing generating stable load.

According to Embodiment 8, the flexure 60 is used in Embodiment 6 in lieu of the flexure 10. It is also possible to employ the flexure 60 in Embodiment 7 in lieu of the flexure 10.

Embodiment 9

Figure 24:
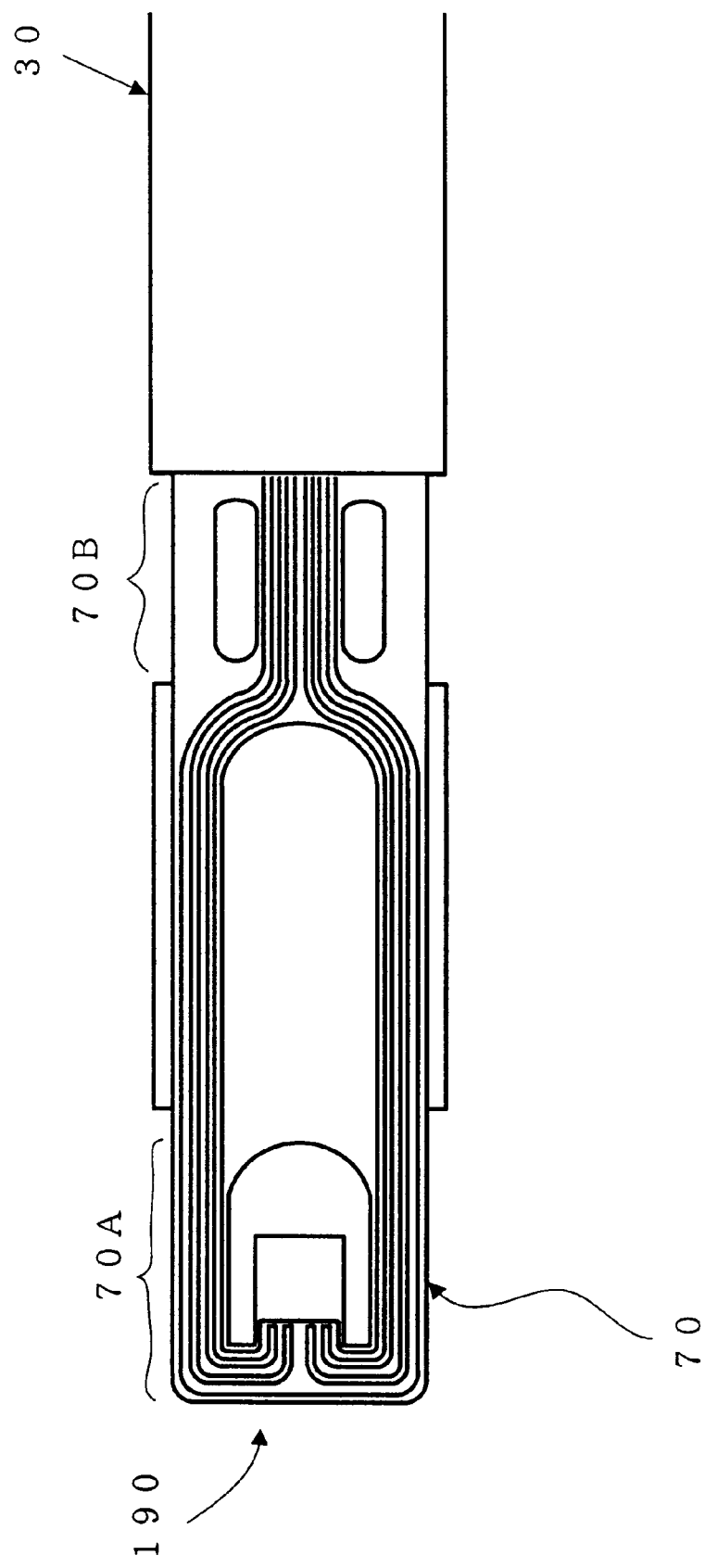
FIG. 24 illustrates a support mechanism for magnetic head sliders of the ninth embodiment of the present invention, as viewed from its disk side.
Figure 25:
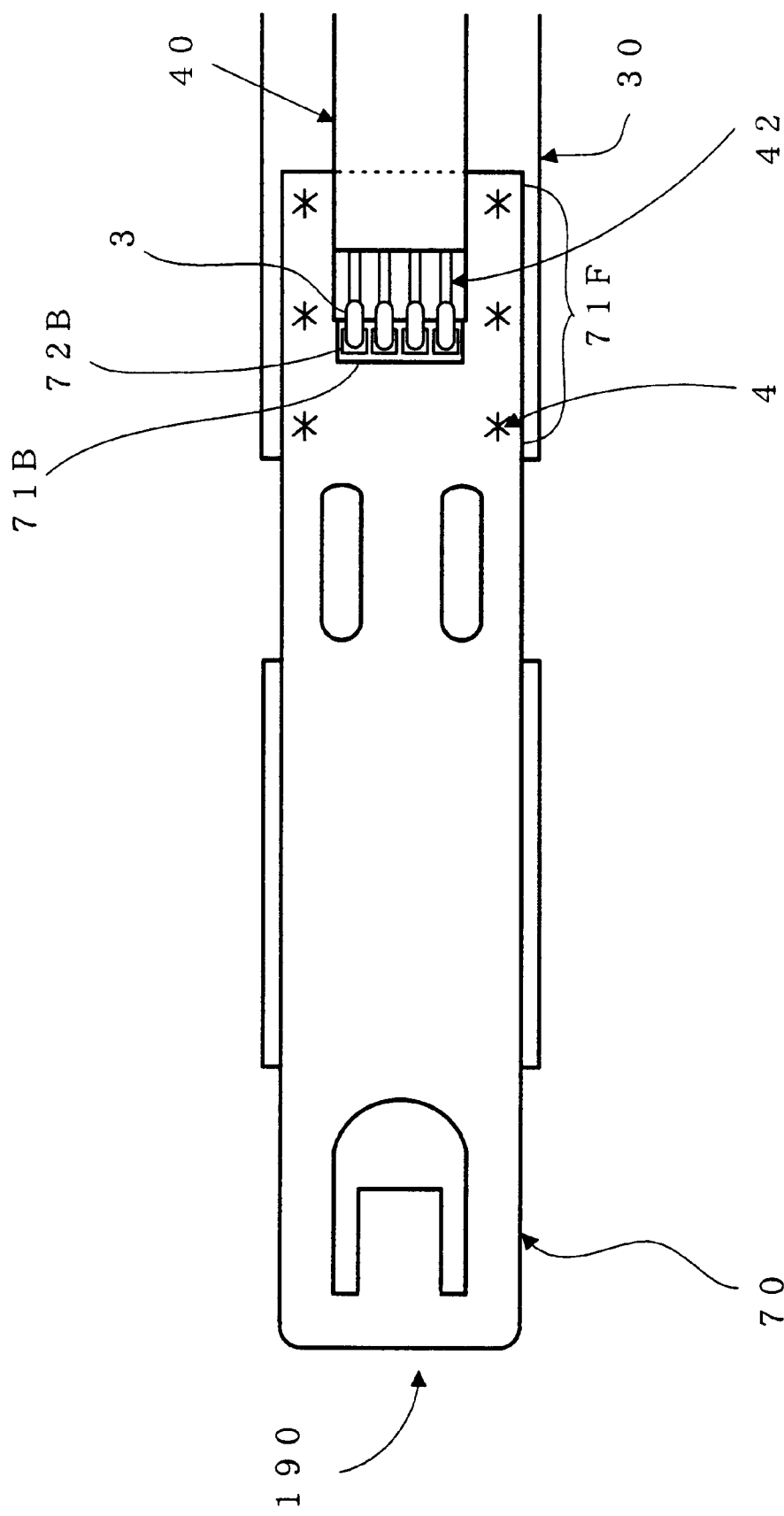
FIG. 25 illustrates the support mechanism for magnetic head sliders of FIG. 24 as viewed from its rear side.
Figure 26:
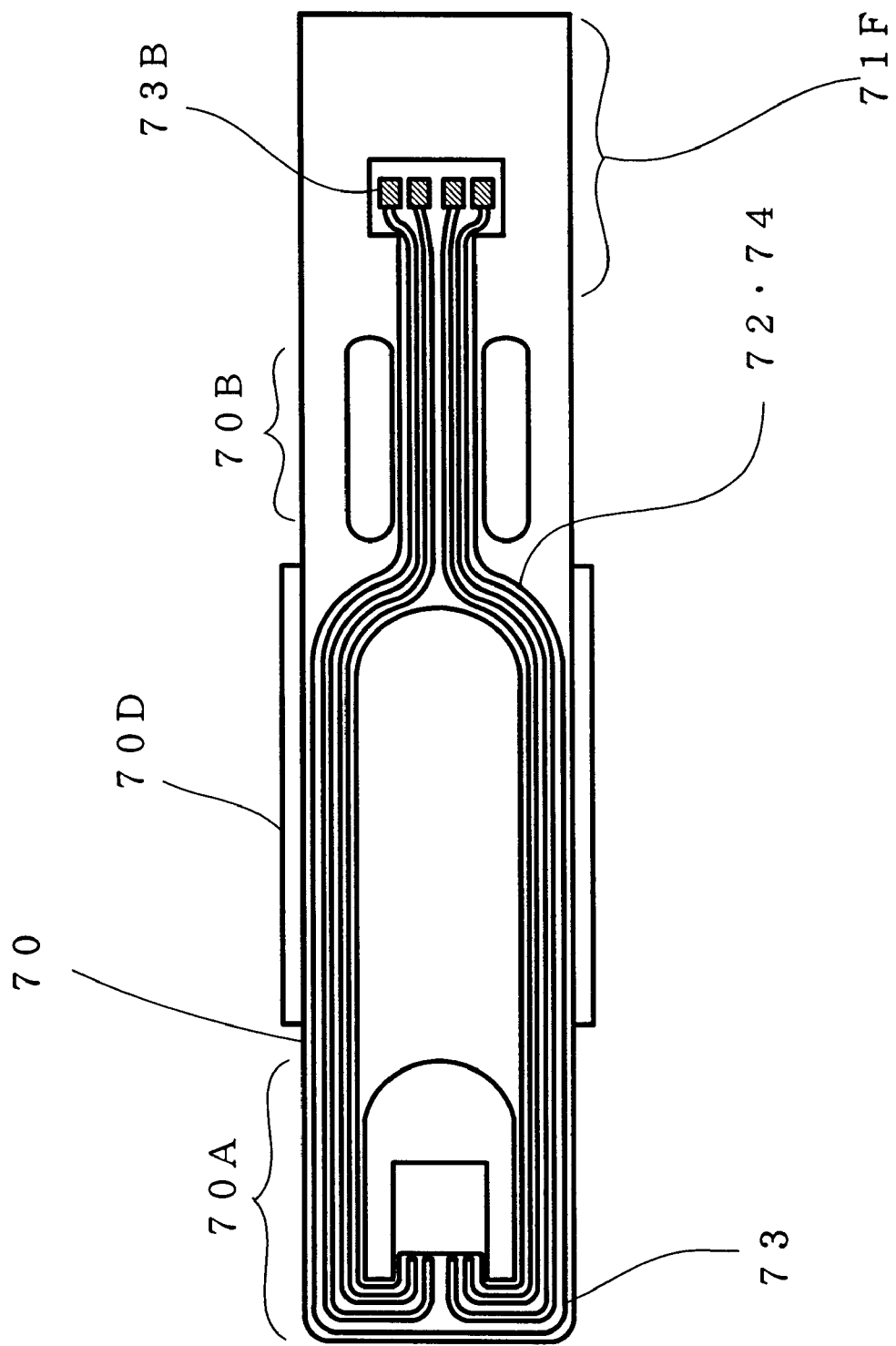
FIG. 26 illustrates a flexure 70 of the support mechanism for magnetic head sliders of FIG. 24, as viewed from its disk side.
Figure 27:
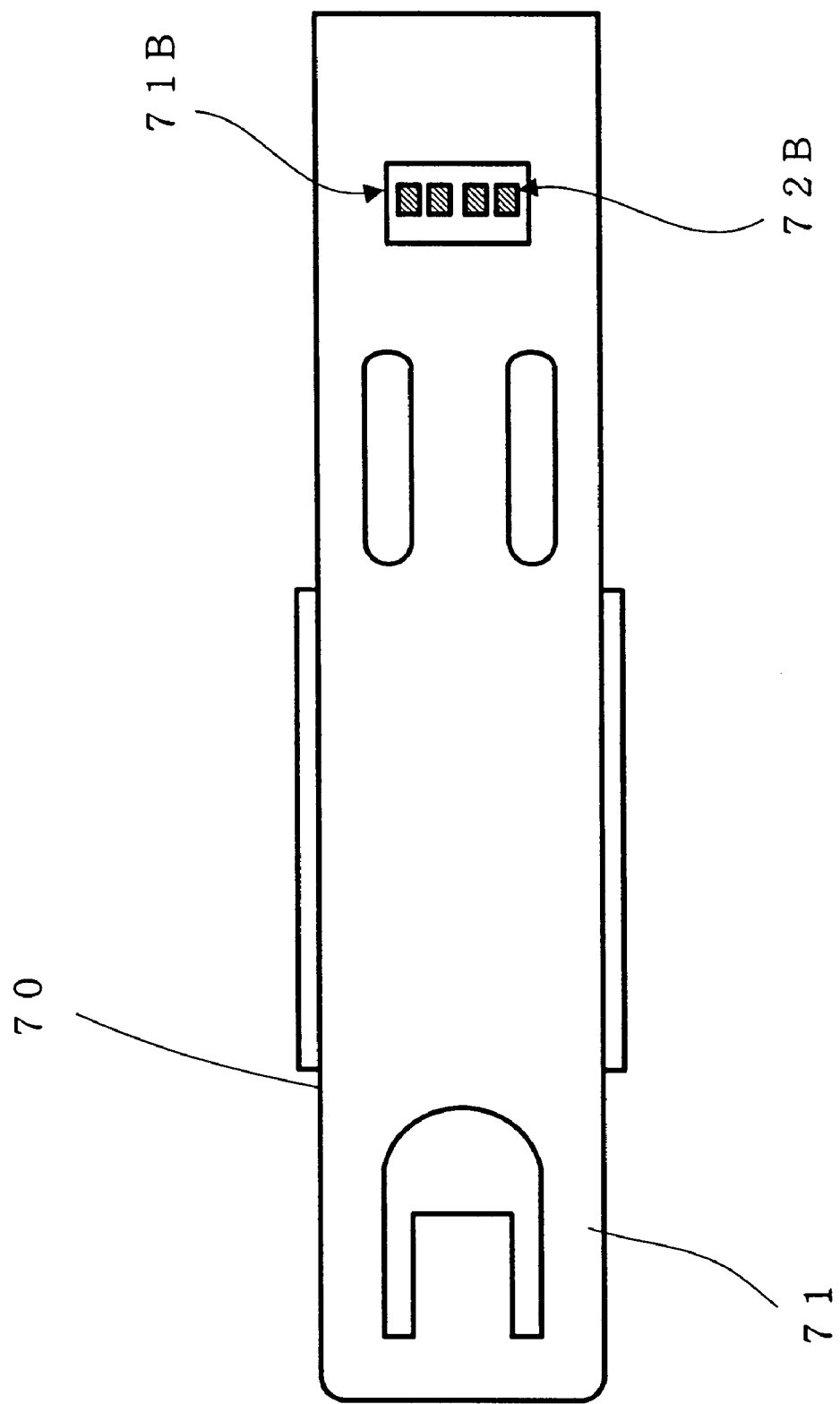
FIG. 27 illustrates a flexure 70 of the support mechanism for magnetic head sliders of FIG. 24, as viewed from its rear side.

The ninth embodiment of the present invention will now be explained with reference to FIGS. 24–27. FIG. 24 illustrates a support mechanism for magnetic head sliders 190 of the present embodiment as viewed from its disk side. FIG. 25 illustrates the mechanism 170 as viewed from its rear side. FIGS. 26 and 27 illustrates a flexure 70 of the present embodiment, as viewed from its disk side and from its rear side, respectively. The same parts as in the previous embodiment or the equivalent parts thereof are denoted by the same reference numerals, and the explanations therefor are omitted below.

The support mechanism 190 of Embodiment 9 for magnetic slider heads comprises, as shown in FIGS. 24–27, a substrate 71 of plate shape; a flexure 70 for supporting the magnetic head slider 1 on the disk 2 side surface of the distal end portion of the flexure substrate 71; and an arm 30 for supporting, with its the distal end portion, the joining region 71F located to the proximal end of the flexure substrate 71.

The flexure 70 comprises a load-bent region 70B and also flange portions 70D between the load-bent region 70B and a gimbal 70A for increasing the stiffness thereof. That is, the flexure 70 functions as both the flexure and the load beam used in Embodiments 1–8.

The flexure substrate 71 of the flexure 70 is joined at its proximal end portion to the rear side surface of the arm 30. The wiring structure is connected to the conductor layer of the FPC 40 joined to the rear side surface of the arm 30. The flexure, the wiring structure and the FPC conductor layer are connected in the same manner as in Embodiment 1.

Next, explained below is a method of producing the slider support mechanism 190 of Embodiment 9. Firstly, a wiring structure is formed on the disk side surface of the flexure substrate 71 in accordance with the same steps as described in Embodiment 1 (see FIGS. 40 and 41). Then, the flange portions are folded up after patterning is conducted on the flexure substrate 71. Next, as shown in FIGS. 24 and 25, the flexure substrate 71 is joined, at the joining region 71F located to the proximal end, to the rear side surface of the distal end portion of the arm 30. The flexure 70 is subjected to bending to form the load-bent region 70B so that the distal end of the flexure 70 may come closer to the magnetic disk 2 relative to the arm 30. Next, the FPC 40 is attached on the rear side of the joining region 71F of the flexure substrate 71. As a last step, the wiring structure of the flexure 70 is connected to the conductor layer of the FPC 40 in accordance with the same manner as in Embodiment 1.

In addition to the same advantages as those of Embodiment 1, according to the support mechanism of Embodiment 9 for magnetic slider heads, it is possible to reduce the number of parts and the number of assembly steps, thereby reducing production cost.

Embodiment 10

Figure 28:
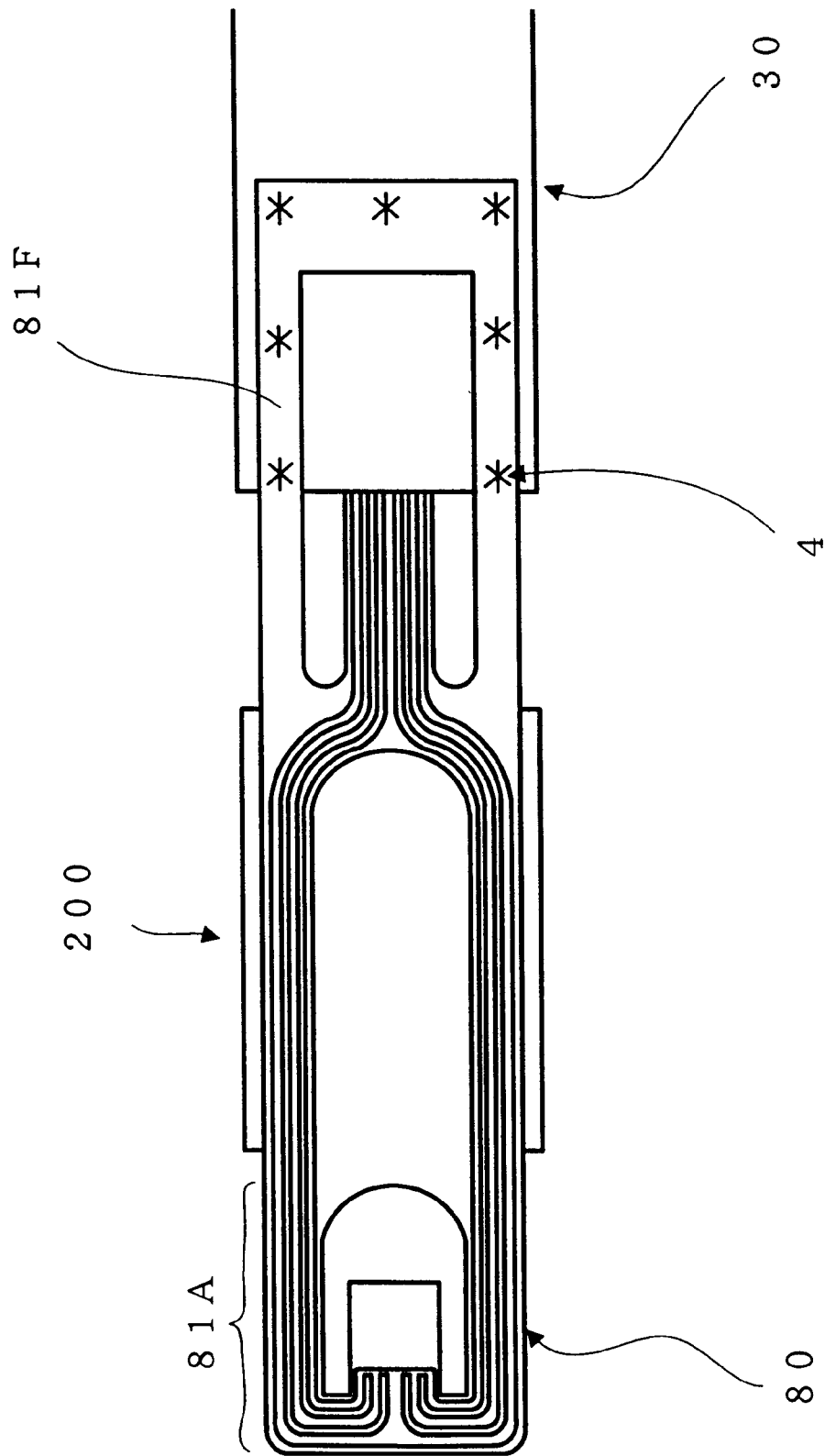
FIG. 28 illustrates a support mechanism for magnetic head sliders of the tenth embodiment of the present invention, as viewed from its disk side.
Figure 29:
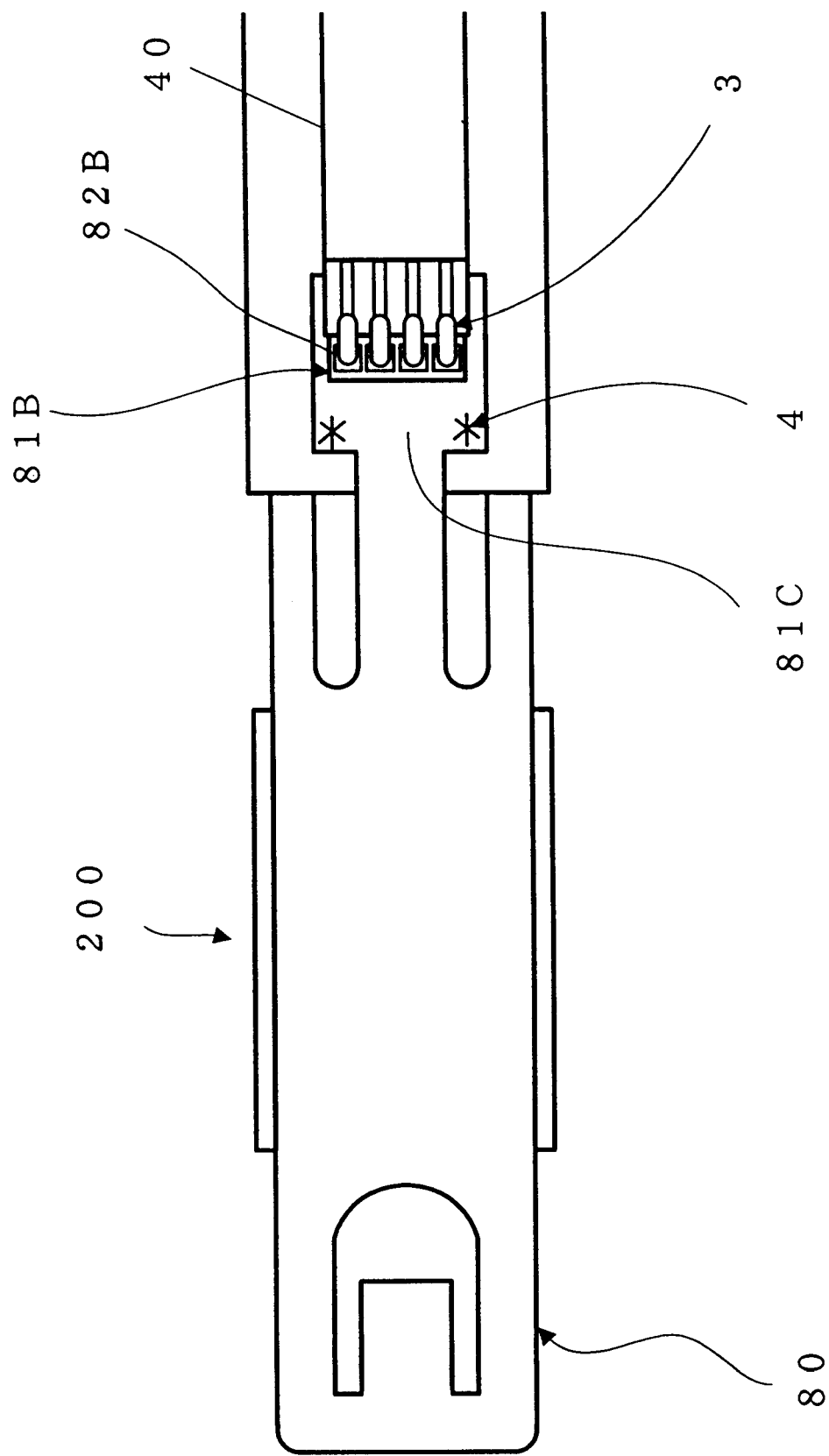
FIG. 29 illustrates the support mechanism for magnetic head sliders of FIG. 28, as viewed from its rear side.
Figure 30:
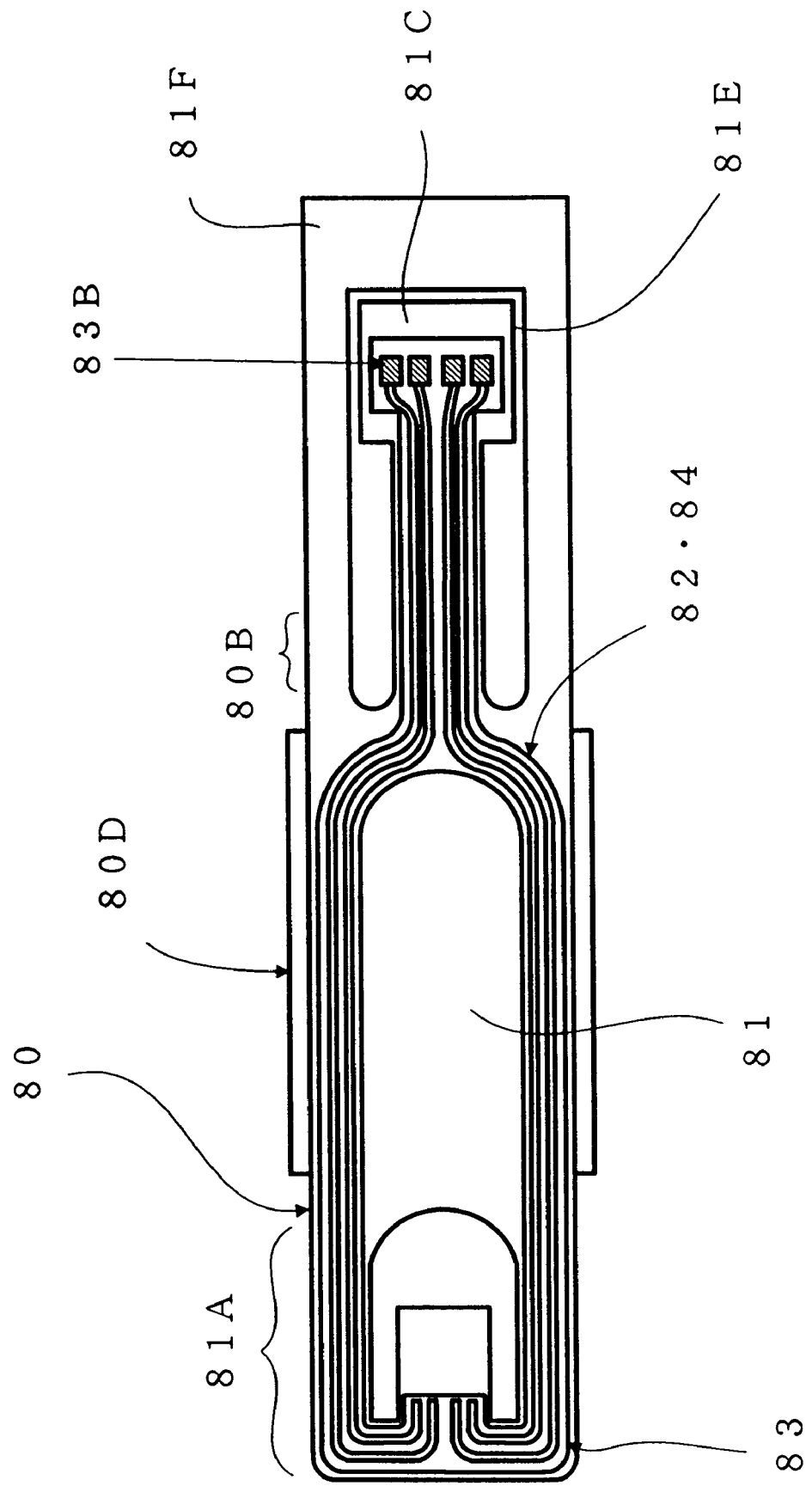
FIG. 30 illustrates a flexure 80 of the support mechanism for magnetic head sliders of FIG. 28, as viewed from its disk side.
Figure 31:
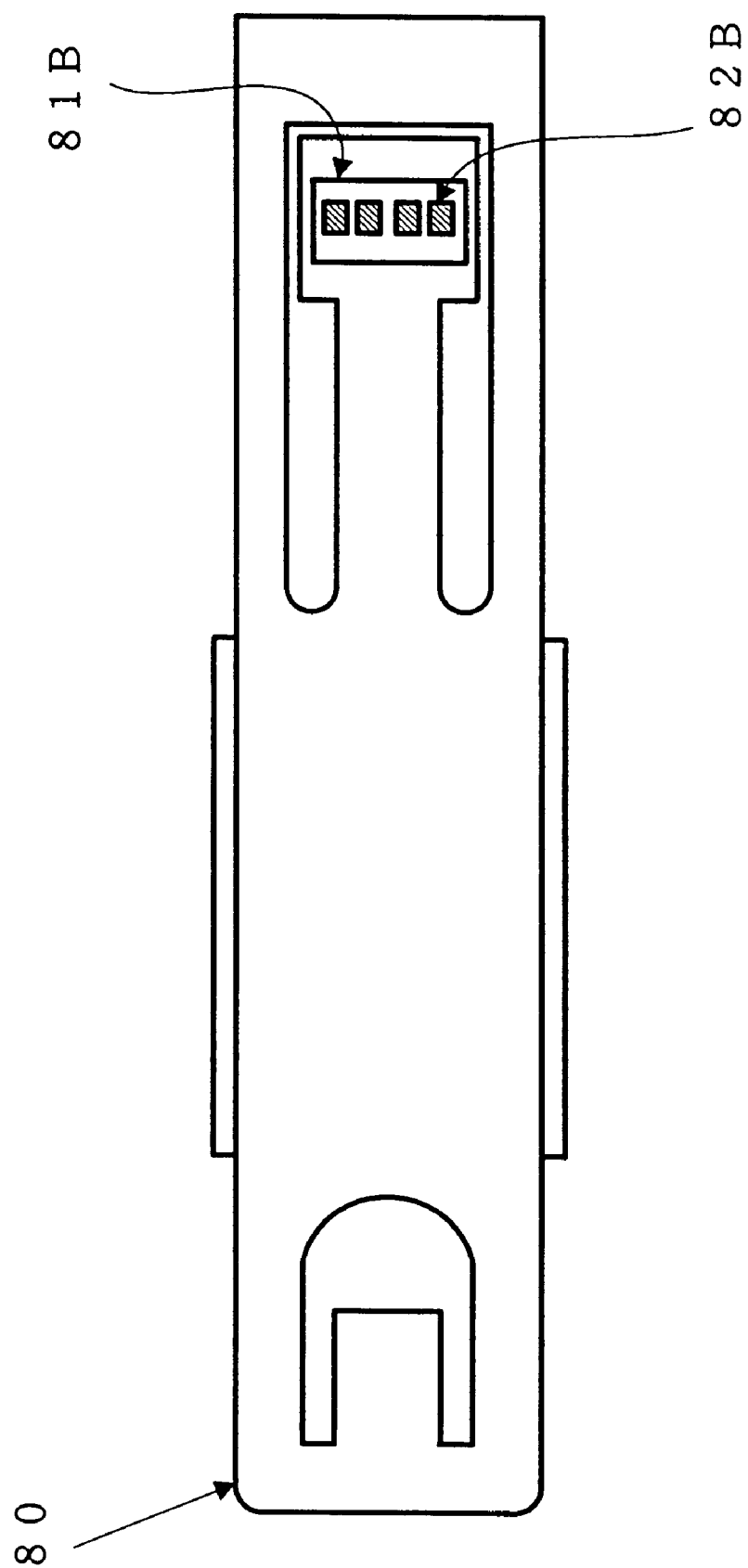
FIG. 31 illustrates the flexure of FIG. 29 as viewed from its rear side.

The tenth embodiment of the present invention will now be explained with reference to FIGS. 28–31. FIG. 28 illustrates a support mechanism 200 of the present embodiment for magnetic head sliders, as viewed from its disk side. FIG. 29 illustrates the mechanism 200 as viewed from its rear side. FIG. 30 illustrates a flexure 80 of the slider support mechanism, as viewed from its disk side. FIG. 31 illustrates the flexure 80 as viewed from its rear side. The same parts as in the previous embodiment or the equivalent parts thereof are denoted by the same reference numerals, and the explanations therefor are omitted below.

The support mechanism for magnetic slider heads 200 of Embodiment 10 employs a flexure 80 in Embodiment 9 in lieu of the flexure 70. In the flexure 80, the joining region 81F is located to the proximal end of the flexure substrate 81 and separated from a portion 81C corresponding to the terminal pads by slits 81E.

According to the support mechanism of Embodiment 10 for magnetic head sliders 200, the joining region 81F at the proximal end of the flexure substrate 81 is attached to the disk side surface of the distal end portion of the arm 30. The flexure 81 is joined, at the positions 81C corresponding to the terminal pads, to the rear side surface of the proximal end portion of the arm.

According to the thus constructed Embodiment 10, it is also possible to obtain the same advantages as those of Embodiment 9.

Embodiment 11

Figure 32:
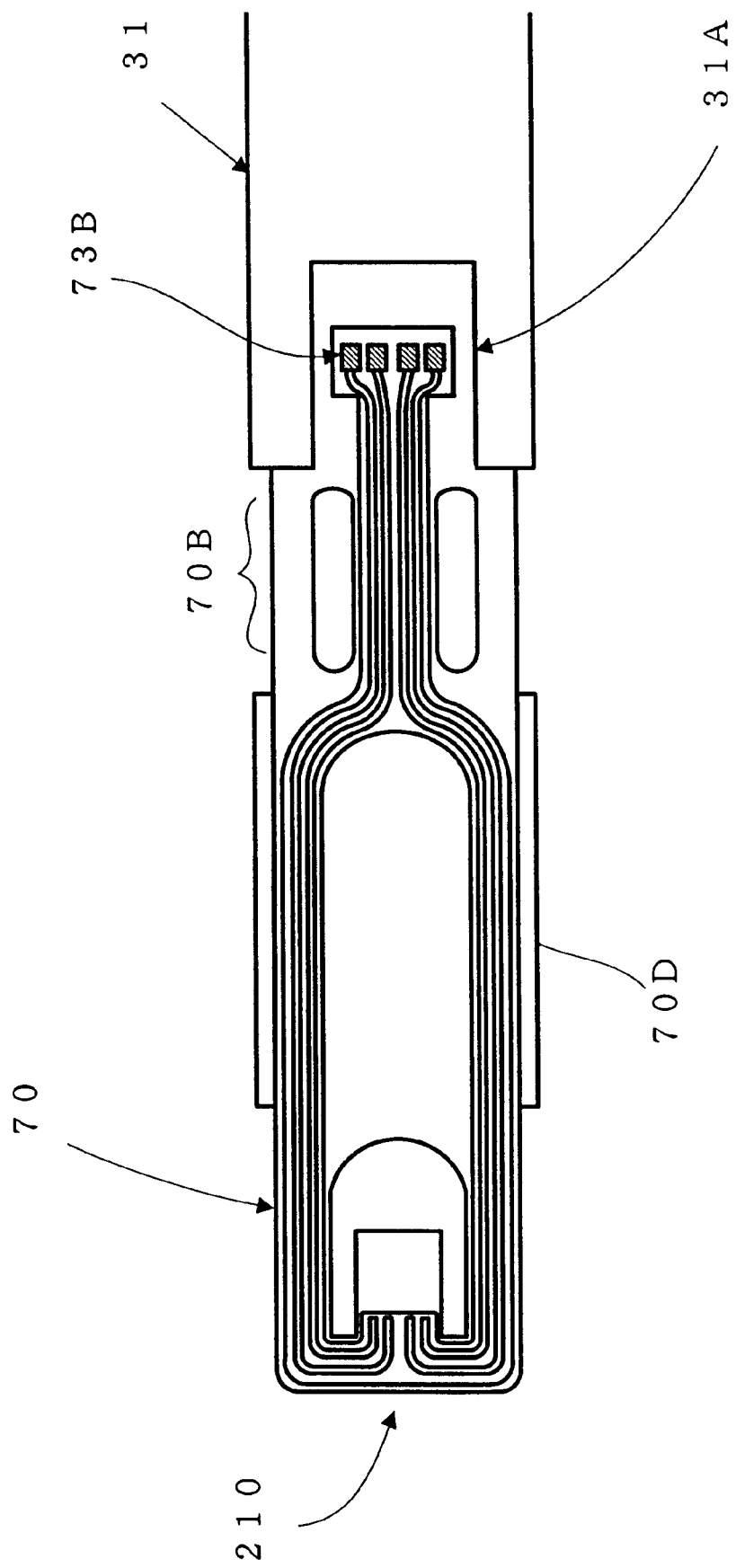
FIG. 32 illustrates a support mechanism for magnetic head sliders of the eleventh embodiment of the present invention, as viewed from its disk side.
Figure 33:
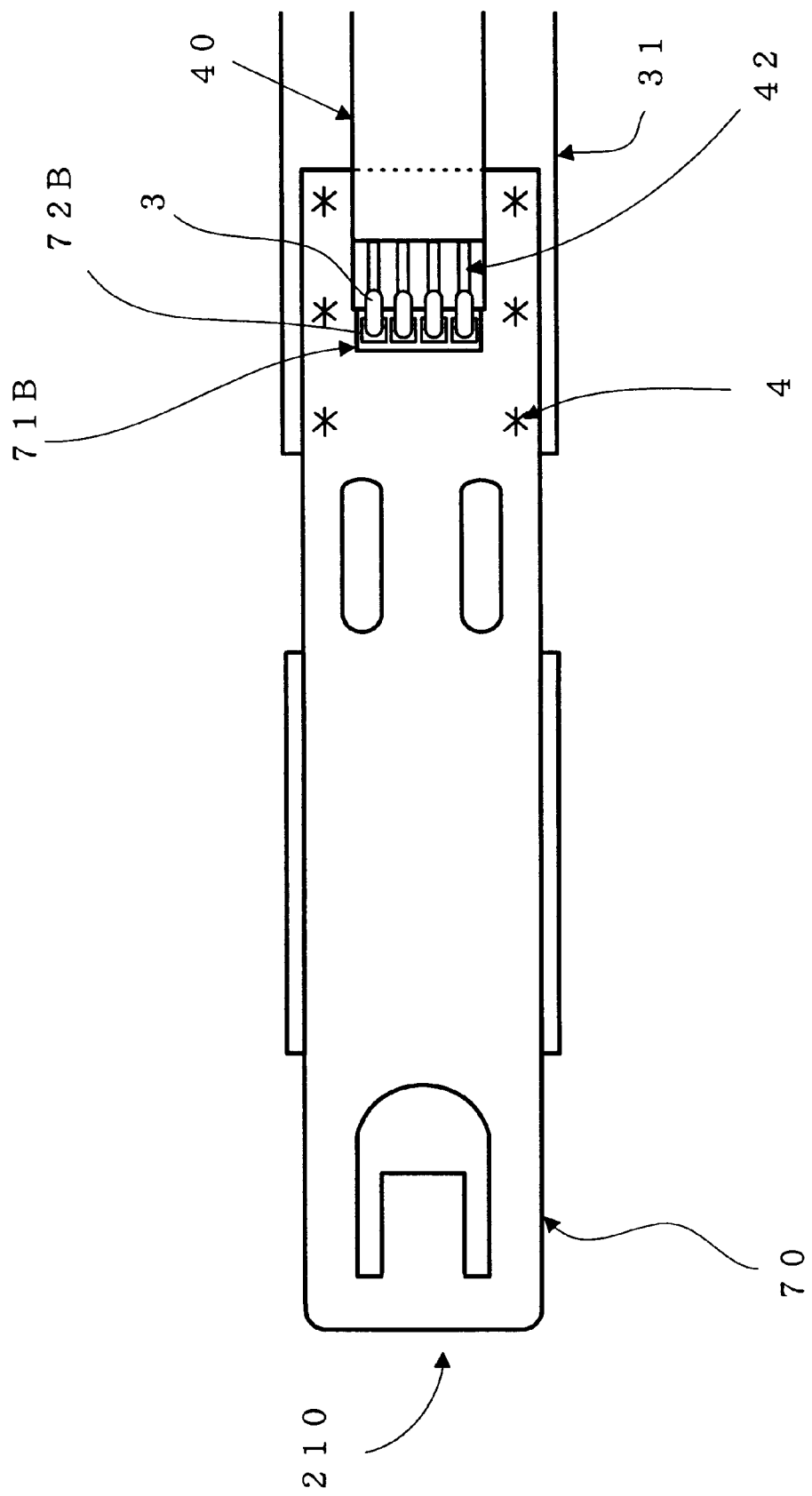
FIG. 33 illustrates the support mechanism for magnetic head sliders of FIG. 32, as viewed from its rear side.

The eleventh embodiment of the present invention will now be explained below with reference to FIGS. 32 and 33. FIG. 32 illustrates a support mechanism 210 of Embodiment 11 for magnetic head sliders, as viewed from its disk side. FIG. 33 illustrates the mechanism 140, as viewed from its rear side. The same parts as in the previous embodiment or the equivalent parts thereof are denoted by the same reference numerals, and the explanations therefor are omitted below.

As shown in FIGS. 32 and 33, in lieu of the arm 30, Embodiment 11 employs an arm 31 in Embodiment 9, which arm is provided at its proximal end with a cutout 31A opened toward the proximal edge. The terminal pads 73B of the flexure are located within the cutout 31A of the arm 31.

In addition to the advantages of Embodiment 9, according to the thus constructed Embodiment 11, it is possible to prevent the wiring structure of the flexure 70 from contacting the edge of the arm 31, thereby preventing the wiring structure from being damaged.

Embodiment 12

Figure 34:
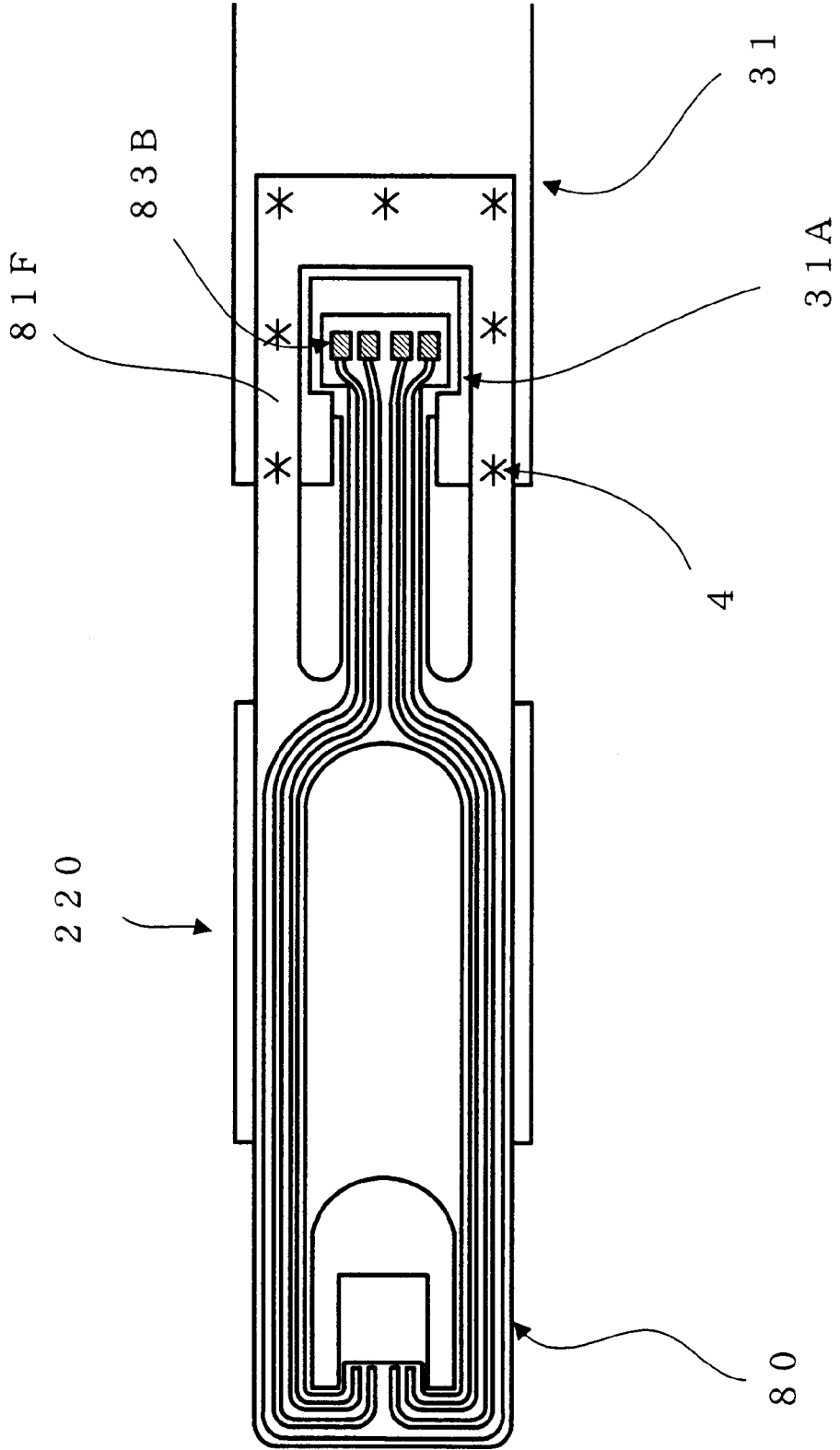
FIG. 34 illustrates a support mechanism for magnetic head sliders of the twelfth embodiment, as viewed from its disk side.
Figure 35:
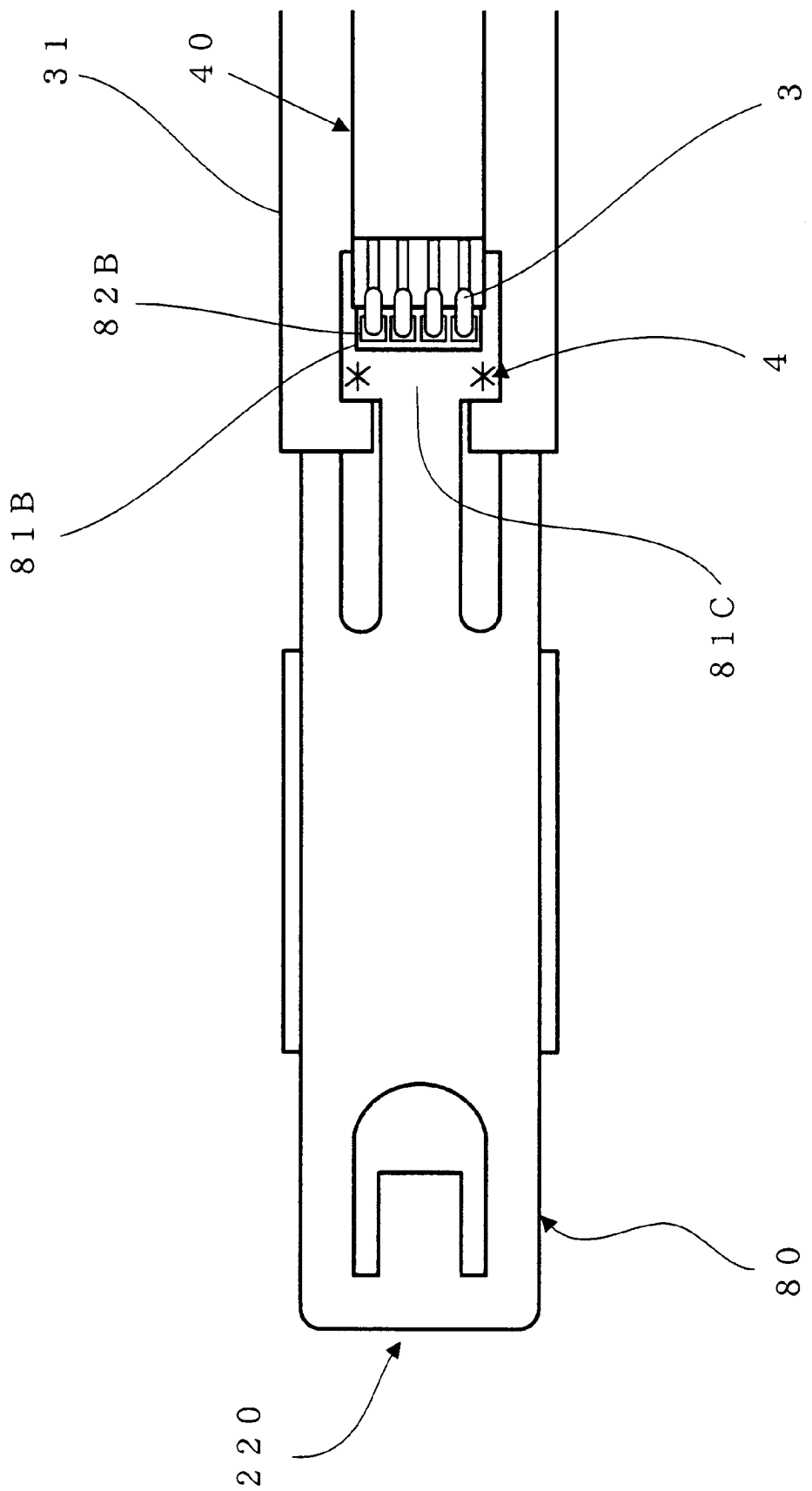
FIG. 35 illustrates the support mechanism for magnetic head sliders of FIG. 34, as viewed from its rear side.

The twelfth embodiment of the present invention will now be explained below with reference to FIGS. 34 and 35. FIG. 34 illustrates a support mechanism 220 of Embodiment 12 for magnetic head sliders, as viewed from its disk side. FIG. 35 illustrates the mechanism 140, as viewed from its rear side. The same parts as in the previous embodiment or the equivalent parts thereof are denoted by the same reference numerals, and the explanations therefor are omitted below.

As shown in FIGS. 34 and 35, in lieu of the arm 30, Embodiment 12 employs an arm 31 in Embodiment 10, which arm is provided at its proximal end with a cutout 31A opened toward the proximal end. The terminal pads are located within the cutout 31A of the arm 31.

The thus constructed Embodiment 12 can attain the same advantages as those of Embodiment 11.

Embodiment 13

Figure 36:
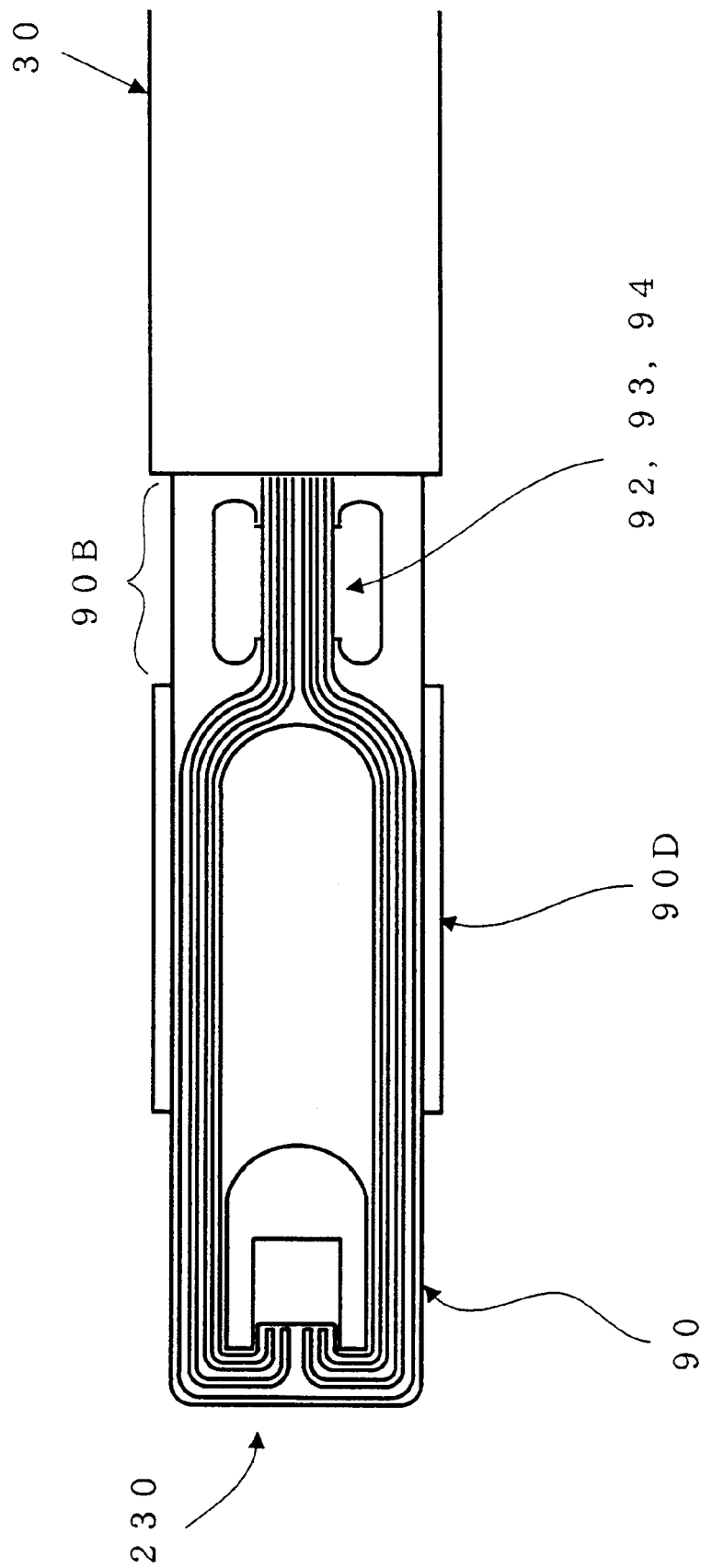
FIG. 36 illustrates a support mechanism for magnetic head sliders of the thirteenth embodiment of the present invention, as viewed from its disk side.
Figure 37:
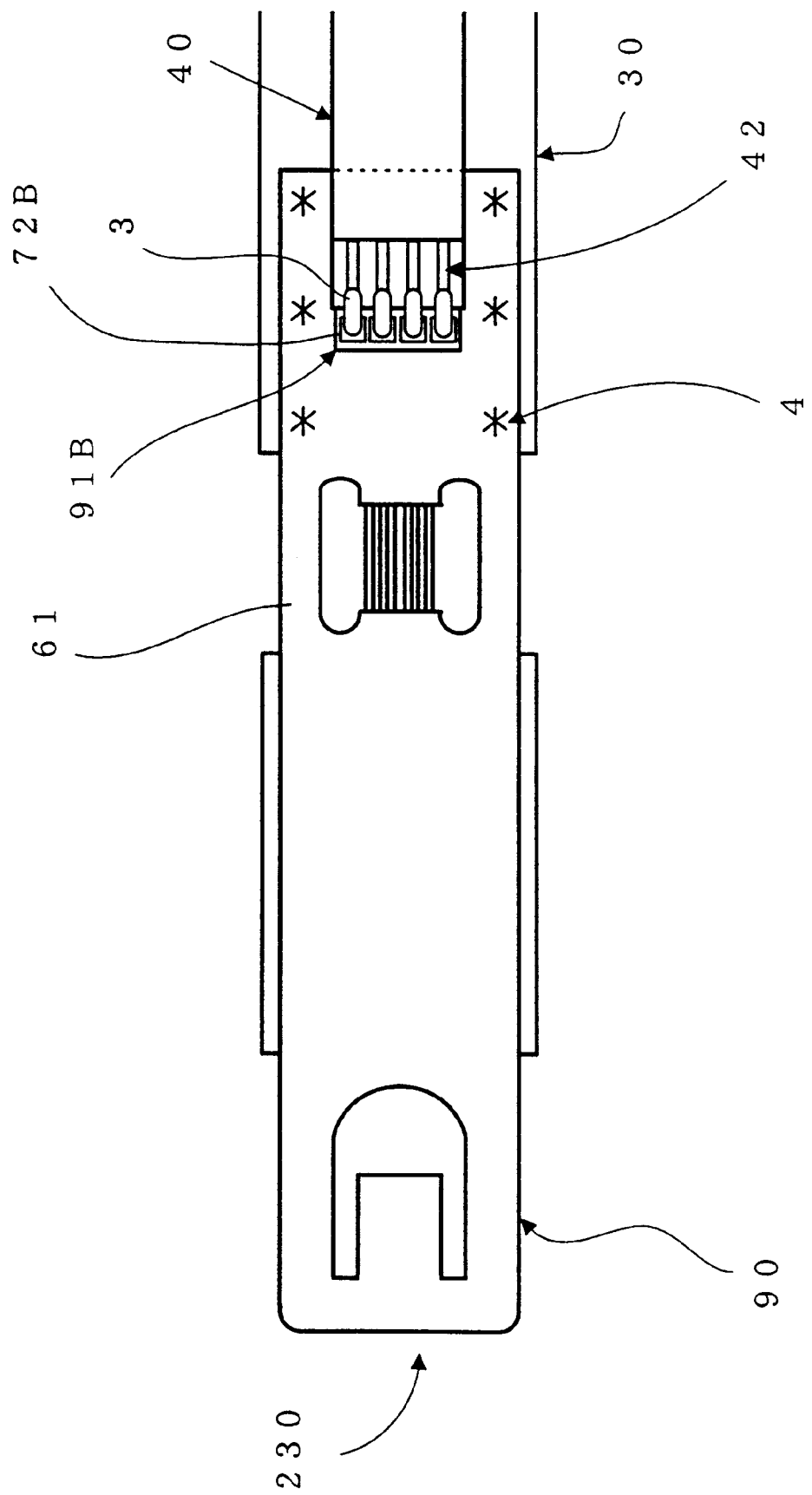
FIG. 37 illustrates the support mechanism for magnetic head sliders of FIG. 36, as viewed from its rear side.

The thirteenth embodiment of the present invention will now be explained below with reference to FIGS. 36 and 37. FIG. 36 illustrates a support mechanism 230 of Embodiment 13 for magnetic head sliders, as viewed from its disk side. FIG. 37 illustrates the mechanism 230, as viewed from its rear side. The same parts as in the previous embodiment or the equivalent parts thereof are denoted by the same reference numerals, and the explanations therefor are omitted below.

As shown in FIGS. 36 and 37, in lieu of the flexure 70, Embodiment 13 employs a flexure 90 in Embodiment 9, which flexure has no flexure substrate 61 under the wiring structure in a load-bent region 90B. Patterning is conducted on the flexure 90 in the same manner as that of Embodiment 5.

According to the thus constructed Embodiment 13, it is possible to obtain the following advantages in addition to those of Embodiment 9. That is, the load-bent region of the flexure has no flexure substrate 61 under the wiring structure in the load-bent region and is formed of only wiring at this portion. Accordingly, the load generated by bending the flexure 90 is not influenced by the flexure itself, resulting in generating stable load.

According to the present embodiment, the flexure 90 is used in Embodiment 9 in lieu of the flexure 70. It is also possible to employ the flexure 90 in Embodiment 11 in lieu of the flexure 70.

Embodiment 14

Figure 38:
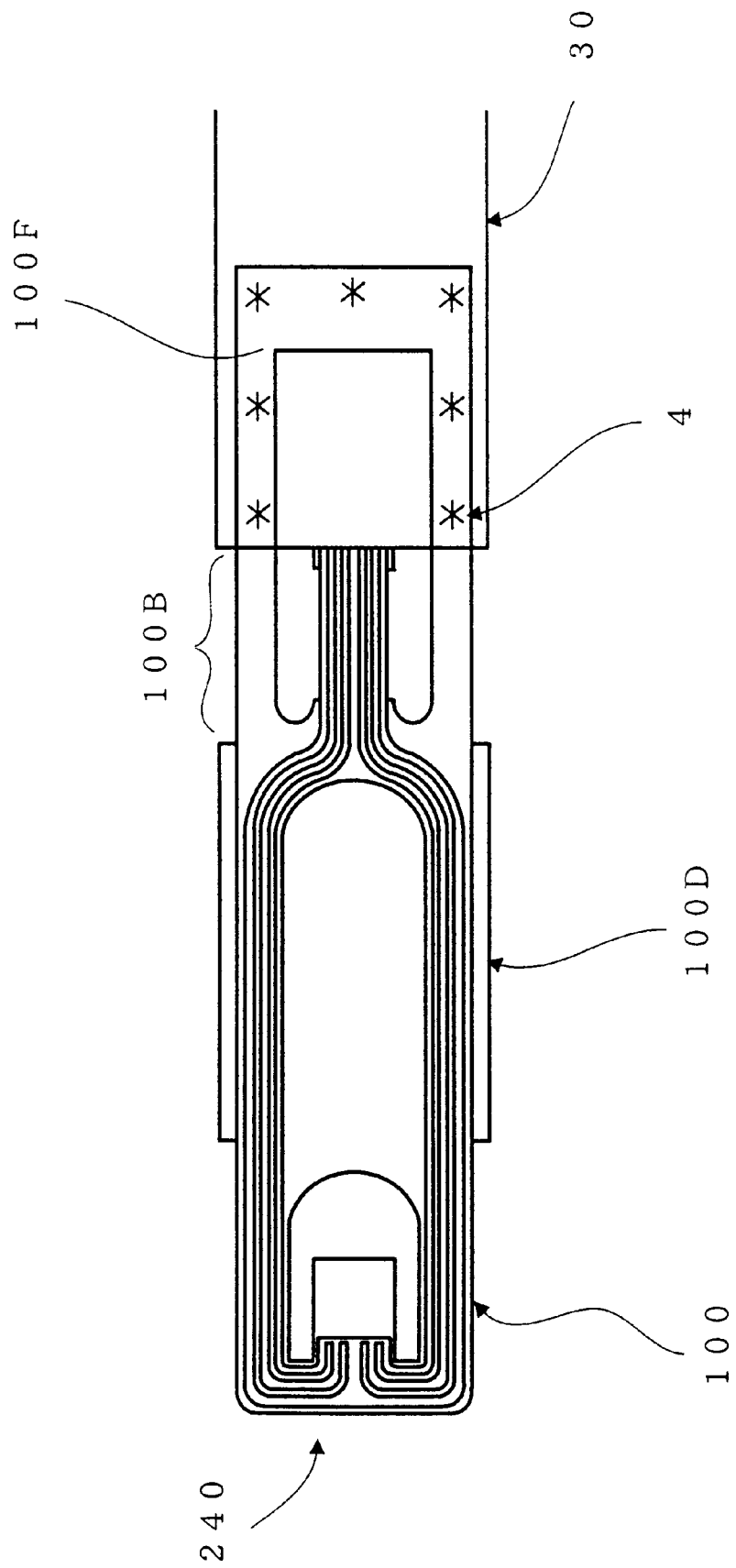
FIG. 38 illustrates a support mechanism for magnetic head sliders of the fourth embodiment, as viewed from its disk side.
Figure 39:
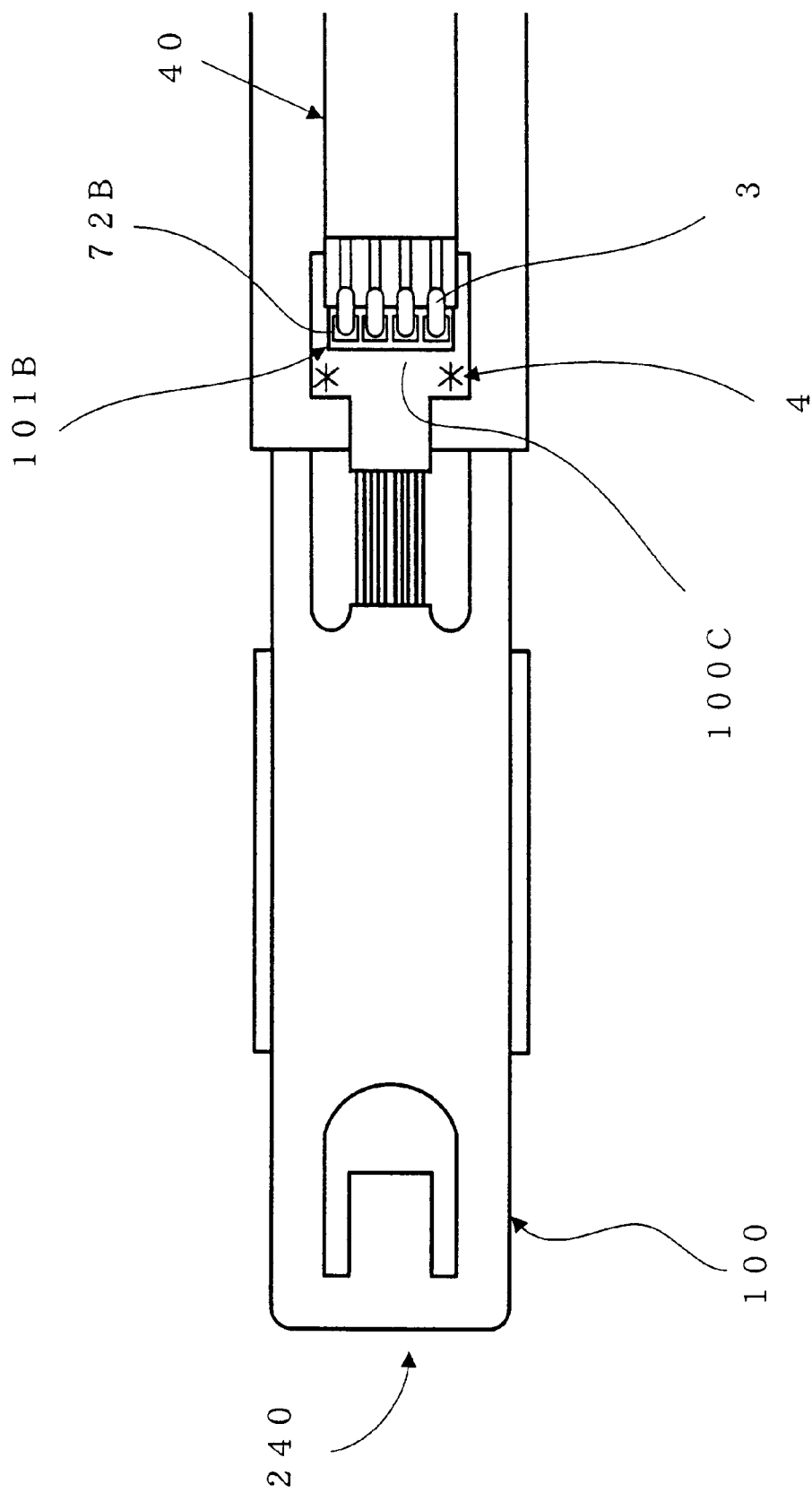
FIG. 39 illustrates the support mechanism for magnetic head sliders of FIG. 38, as viewed from its rear side.

The fourteenth embodiment of the present invention will now be explained below with reference to FIGS. 38 and 39. FIG. 38 illustrates a support mechanism 240 of Embodiment 14 for magnetic head sliders, as viewed from its disk side. FIG. 39 illustrates the mechanism 240, as viewed from its rear side. The same parts as in the previous embodiment or the equivalent parts thereof are denoted by the same reference numerals, and the explanations therefor are omitted below.

As shown in FIGS. 38 and 39, in lieu of the flexure 80, Embodiment 14 employs a flexure 90 in Embodiment 10, which flexure has no flexure substrate under the wiring structure in a load-bent region 90B.

According to the thus constructed Embodiment 14, it is possible to obtain the following advantages in addition to those of Embodiment 10. That is, the load-bent region of the flexure 90 has no flexure substrate under the wiring structure and is formed of only wring at this portion. Accordingly, the load generated by bending the flexure 90 is not influenced by the flexure itself, resulting in generating stable load.

According to the present embodiment, the flexure 90 is used in Embodiment 10 in lieu of the flexure 80. It is also possible to employ the flexure 90 in Embodiment 12.

The respective embodiments described above comprise FPC via which the wiring structure is connected to the outside. In lieu of the FPC, it is also possible to use a lead.

ADVANTAGE OF THE INVENTION

According to the support mechanism for magnetic head sliders of the present invention, a flexure is passed through an aperture formed in a load beam, and terminal pads formed on the disk side surface of the flexure are exposed from the rear side surface of the flexure for connection with FPC and the like formed on the rear side surface of an arm. Therefore, it becomes unnecessary to fold the wiring structure as often seen in the prior art, thereby preventing the wiring structure from being damaged at the folded portion and therefore improving the reliability of the wiring structure.

Since it is not necessary to fold the wiring structure, it is possible to produce the flexure patterns of substantial rectangular shape having no extension, thereby arranging the flexure pattern in a sheet with higher density than the prior art flexures so as to reduce production cost.

Since the flexure terminal pads are connected to the FPC directly on the rear side surface of the arm, and the connecting portion is of two layer construction, it is possible to reduce the thickness of the slider support mechanism and therefore reduce the distance between a number of disks disposed in a fixed disk drive, thereby downsizing the fixed magnetic disk drive.

The aperture of the load beam is extended onto the rear side surface of the arm to connect the flexure terminal pads to the FPC and the like within the aperture. Accordingly, it is not necessary to pass the flexure through the aperture of the load beam, thereby welding both the load beam and the flexure on the rear side surface of the arm after welding the flexure on the disk side surface of the load beam and therefore simplifying assembly process and reducing production cost.

Since a cutout opened toward the distal end is formed in the distal end of the load beam to prevent the flexure terminal pads and the wiring structure from contacting the distal edge of the arm, it is possible to prevent the wiring structure from being damaged at the arm edge.

In the load-bent region, since there is no substrate provided under the wiring structure, it is possible to prevent the load generated by the load-bent from being affected by the substrate under the wiring structure, thereby reducing the dispersion of the load.

According to the method of the present invention for producing the support mechanism for magnetic head sliders, the lower layer of the conductor layer functions as an etching stopper layer. Accordingly, it is possible to automatically stop the etching operation for forming-a flexure aperture when the lower layer appears, thereby forming the terminal pads of the conductor layer on the rear side of the flexure stably and with good yieldability.

According to the present invention, it is unnecessary to fold up the wiring structure of the disk side surface of the flexure constituting part of the suspension onto the opposite side and secure the wiring structure there, thereby simplifying assembly process and reducing production cost.

Further, it is possible to eliminate the problem of damaging the wiring structure in bending the wiring structure with a mold.

I claim:

1. A support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk, said mechanism comprising:

a flexure comprising: i) a substrate of plate shape wherein the magnetic head slider is mounted on the disk side surface of a distal end portion of the substrate; and ii) a wiring structure formed integrally on the disk side surface of said substrate, said wiring structure including an insulating layer on the disk side surface, a conductor layer extending longitudinally to the substrate on the insulating layer; and a protection layer covering the conductor layer; and a load beam longitudinally jointed to the flexure substrate and constituting a suspension together with the flexure;

wherein the conductor layer includes i) slider pads provided on the distal end portion of the substrate for connection with the magnetic head of the magnetic head slider and ii) terminal pads provided on the proximal end portion of the substrate for connection with the external wiring, wherein the load beam has an aperture extending from the disk side surface of the load beam to the opposite rear side surface of the load beam, wherein the flexure has its distal end portion extending along the disk side surface of the load beam and has the proximal end portion passing through the aperture of the load beam to reach the rear side surface of the load beam, the slider pads are exposed outside on the disk side surface of the flexure via openings formed in the protection layer, the insulating layer having at least one opening and the flexure substrate having at least one opening, wherein the terminal pads are exposed outside on the rear side surface of the flexure via said at least one opening in the flexure substrate and said at least one opening in the insulating layer.

2. A support mechanism for magnetic head sliders according to claim 1, further comprising an arm adopted to be mounted on the rotational shaft at its proximal end portion and jointed to a distal end portion of the load beam to support the load beam.

3. A support mechanism for magnetic head sliders according to claim 2, wherein the disk side surface of the proximal end portion of the load beam is jointed to the rear side surface of the distal end portion of the arm, and wherein the flexure has the proximal end portion of the substrate extending beyond the proximal end portion of the load beam to reach the arm and jointed to the rear side surface of the arm, wherein the terminal pads are arranged on the rear side surface of the arm.

4. A support mechanism for magnetic head sliders according to claim 2, wherein the rear side surface of the proximal end portion of the load beam is jointed to the disk side surface of the distal end portion of the arm, and wherein the flexure has the proximal end of the substrate extending to reach the rear side surface of the arm and jointed thereto, wherein the terminal pads are arranged on the rear side surface of the arm.

5. A support mechanism for magnetic head sliders according to claim 4, wherein the arm has the distal end portion with a distal edge forming a cutout, and wherein the terminal pads of the flexure are located within the cutout of the arm.

6. A support mechanism for magnetic head sliders according to claim 2, wherein the disk side surface of the proximal end portion of the load beam is jointed to the rear side surface of the distal end portion of the arm, and wherein the terminal pads of the flexure are arranged on the rear side surface of the proximal end portion of the load beam.

7. A support mechanism for magnetic head sliders according to claim 1, wherein a flexible print-circuit substrate is joined to the rear side surface of the arm, which flexible substrate is connected at its one end to the terminal pads of the flexure.

8. A support mechanism for magnetic head sliders according to claim 1, wherein the load beam is bent with load so that the magnetic head slider to be mounted on the flexure may come near the magnetic disk.

9. A support mechanism for magnetic head sliders according to claim 8, wherein the aperture of the load beam is formed in the load-bent region, and wherein the flexure is formed of only wiring at least at the position corresponding to the load-bet region of the load beam.

10. A support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk, said mechanism comprising:

a flexure constituting a suspension and comprising: i) a substrate of plate shape wherein the magnetic head slider is mounted on the disk side surface of a distal end portion of the substrate; and ii) a wiring structure formed integrally on the disk side surface of said substrate, said wiring structure including an insulating layer on the disk side surface, a conductor layer extending longitudinally to the substrate on the insulating layer; and a protection layer covering the conductor layer; and an arm mounted on the rotational shaft at its proximal end portion and jointed to a distal end portion of the flexure to support the flexure, wherein the conductor layer includes i) slider pads provided on the distal end portion of the substrate and connected to the magnetic head of the magnetic head slider and ii) terminal pads provided on the proximal end portion of the substrate and connected to the external wiring, and wherein the slider pads are exposed outside on the disk side surface of the flexure via openings formed in the protection layer, the insulating layer has at least one opening, the flexure substrate has at least one opening, and the terminal pads of the flexure are exposed outside on the rear side surface of the flexure through said at least one opening in the flexure substrate and said at least one opening in the insulating layer.

11. A support mechanism for magnetic head sliders according to claim 10, wherein the disk side surface of the distal end portion of the flexure substrate is jointed to the rear side surface of the distal end portion of the arm, and wherein the terminal pads of the flexure are arranged on the rear side surface of the arm.

12. A support mechanism for magnetic head sliders according to claim 11, wherein the arm has the distal end portion with a distal edge forming a cutout, and wherein the terminal pads of the flexure are located within the cutout of the arm.

13. A support mechanism for magnetic head sliders according to claim 10, wherein the rear side surface of the distal end portion of the flexure substrate is jointed to the disk side surface of the distal end portion of the arm, and wherein the terminal pads of the flexure are arranged on the rear side surface of the arm.

14. A support mechanism for magnetic head sliders according to claim 10, wherein the flexure substrate is bent with load so that the magnetic head slider to be mounted on the flexure may come near the magnetic disk, and wherein the flexure has no substrate under the wiring structure in the load-bent region.

15. A support mechanism for magnetic head sliders, wherein the support mechanism has a magnetic head slider attached at its distal end, and wherein the support mechanism is supported at its proximal end by a rotational shaft, the support mechanism being moved to take a read and write position and an offset position therefrom relative to a magnetic disk, said mechanism comprising:

a flexure comprising: i) a substrate of plate shape wherein the magnetic head slider is mounted on the disk side surface of a distal end portion of the substrate; and ii) a wiring structure formed integrally on the disk side surface of said substrate, said wiring structure including an insulating layer on the disk side surface, a conductor layer extending longitudinally to the substrate on the insulating layer; and a protection layer covering the conductor layer;

a load beam longitudinally jointed to the flexure substrate and constituting a suspension together with the flexure; and an arm mounted on the rotational shaft at its proximal end portion and jointed to a proximal end portion of the load beam to support the load beam, wherein the conductor layer includes i) slider pads provided on the distal end portion of the substrate and connected to the magnetic head of the magnetic head slider and ii) terminal pads provided on the proximal end portion of the substrate and connected to the external wiring, wherein the load beam has an aperture extending from the disk side surface of the load beam to the opposite rear side surface of the load beam and has the disk side surface of the proximal end portion jointed to the rear side surface of the arm, wherein the rear side surface of the distal end of the arm is exposed outside through the aperture of the load beam, wherein the flexure has its distal end portion extending along the disk side surface of the load beam and has the disk side surface of the proximal end portion of the substrate jointed to the rear side surface of the arm within the aperture of the load beam, the slider pads are exposed outside on the disk side surface of the flexure via openings formed in the protection layer, the insulating layer has at least one opening and the flexure substrate has at least one opening, and wherein the terminal pads are located within the aperture of the load beam and exposed outside on the rear side surface of the flexure via said at least one opening in the flexure substrate and said at least one opening in the insulating layer.

16. A support mechanism for magnetic head sliders according to claim 15, wherein the arm has the distal end portion with a distal edge forming a cutout, and wherein the terminal pads of the flexure are located within the cutout of the arm.

17. A support structure for a magnetic head slider for reading/writing, comprising:

(a) a wiring flexure comprising:
  (i) a plate substrate having a distal end and a proximal end and having an opening at the proximal end;
  (ii) an insulating layer formed on the plate substrate and having at least one through-hole at its proximal end;
  (iii) a conductor layer formed on the insulating layer, said conductor layer having terminal pads at its proximal end for connecting external wiring, and slider pads at its distal end for connecting a magnetic head, said terminal pads being exposed to the external wiring through said opening of the plate substrate and said at least one through-hole of the insulating layer; and
  (iv) a protection layer formed on the conductor layer and having at least one through-hole at its distal end, said slider pads of the conductor layer being exposed to the magnetic head through said at least one through-hole of the protection layer; wherein said wiring flexure has a plate substrate side, through which said terminal pads are exposed at its proximal end, and a protection layer side, through which said slider pads are exposed at its distal end; and (b) a load beam having two sides through which an aperture is formed, said aperture being located at a position between the distal end and the proximal end of the flexure when placed through the aperture, wherein the plate substrate side at the distal end and the protection layer side at the proximal end are attached to the respective sides of the load beam.

18. The support structure according to claim 17, further comprising an arm having a distal end where the load beam is supported.

19. The support structure according to claim 18, wherein the side of the load beam opposite to the side to which the wiring flexure is attached is connected to the arm.

20. The support structure according to claim 19, wherein the arm is provided with the external wiring on a side on which the load beam is placed, and the external wiring is connected to the terminal pads of the wiring flexure.

21. The support structure according to claim 18, wherein the arm has a proximal end where the arm is supported by a rotation shaft.

* * * * *

UNITED STATES PATENT AND TRADEMARK OFFICE
CERTIFICATE OF CORRECTION

PATENT : 6,057,986

DATED : May 2, 2000

INVENTOR(S) : Satoru Takasugi

It is certified that error appears in the above-identified patent and that said Letters Patent is hereby corrected as shown below:

On the title page, Item [54] title, delete "SUPPORT MECHANISM FOR MAGNETIC HEAD SLIDERS AND METHOD FOR PRODUCING THE SAME" and insert --SUPPORT MECHANISM FOR MAGNETIC HEAD SLIDERS PROVIDED WITH WIRING FLEXURE PLACED THROUGH LOAD BEAM--.

Signed and Sealed this

Twentieth Day of March, 2001

Attest:

NICHOLAS P. GODICI

Attesting Officer

Acting Director of the United States Patent and Trademark Office